United States Patent
Manion et al.

(10) Patent No.: US 8,688,803 B2
(45) Date of Patent: Apr. 1, 2014

(54) METHOD FOR EFFICIENT CONTENT DISTRIBUTION USING A PEER-TO-PEER NETWORKING INFRASTRUCTURE

(75) Inventors: Todd R. Manion, Redmond, WA (US); Ravi T. Rao, Redmond, WA (US); Michael Shappell, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 2185 days.

(21) Appl. No.: 10/810,917

(22) Filed: Mar. 26, 2004

(65) Prior Publication Data
US 2005/0216559 A1    Sep. 29, 2005

(51) Int. Cl.
*G06F 15/177*    (2006.01)
(52) U.S. Cl.
USPC ........... 709/218; 707/622; 707/636; 707/632; 707/638; 726/2; 717/168; 717/172; 717/173
(58) Field of Classification Search
USPC ............ 709/201, 203–205, 200, 248; 705/26, 705/26.1, 301, 342–343; 707/10, 609–610, 707/620–622, 638, 821, 899
See application file for complete search history.

(56) References Cited

U.S. PATENT DOCUMENTS

| | | | |
|---|---|---|---|
| 5,369,705 A | 11/1994 | Bird et al. |
| 5,371,794 A | 12/1994 | Diffie et al. |
| 5,386,542 A | 1/1995 | Brann et al. |
| 5,586,264 A | 12/1996 | Belknap et al. |
| 5,712,914 A | 1/1998 | Aucsmith et al. |
| 5,731,421 A | 3/1998 | Tzikas et al. |
| 5,744,794 A | 4/1998 | Michie et al. |
| 5,748,736 A | 5/1998 | Mittra |
| 5,806,075 A | 9/1998 | Jain et al. |
| 5,832,514 A | 11/1998 | Norin et al. |
| 5,854,898 A | 12/1998 | Riddle |
| 5,901,227 A | 5/1999 | Perlman |

(Continued)

FOREIGN PATENT DOCUMENTS

| | | |
|---|---|---|
| EP | 1248441 A2 | 10/2002 |
| GB | 2378268 A | 5/2003 |

(Continued)

OTHER PUBLICATIONS

Druschel, P., et al., PAST: A large-scale, persistent peer-to-peer storage utility, at Rice University and Microsoft Research, 6 pages.

(Continued)

*Primary Examiner* — Greg C Bengzon
(74) *Attorney, Agent, or Firm* — Andrew Sanders; Micky Minhas

(57) ABSTRACT

Disclosed is a method for efficiently distributing content by leveraging the use of a peer-to-peer network infrastructure. In a network of peers, a handful peers can receive content from centralized servers. These peers can then flood this content out to more clients who in turn can send the content along to others. Ultimately, a request for content can be fulfilled by locating the closest peer and obtaining the content from that peer. In one embodiment the method can be used to distribute content by creating content distribution groups of one or more client computing devices and redirecting requests for content from the server to the content distribution group. A further contemplated embodiment efficiently streams time sensitive data through the use of a spanning tree architecture of peer-to-peer clients. In yet another embodiment the present invention provides for more efficient use of bandwidth for shared residential broadband connections.

42 Claims, 10 Drawing Sheets

(56) References Cited

U.S. PATENT DOCUMENTS

| | | | |
|---|---|---|---|
| 5,901,228 A * | 5/1999 | Crawford | 705/34 |
| 5,907,685 A | 5/1999 | Douceur | |
| 5,917,480 A | 6/1999 | Tafoya et al. | |
| 5,922,074 A | 7/1999 | Richard et al. | |
| 5,933,849 A | 8/1999 | Srbljic et al. | |
| 5,944,794 A | 8/1999 | Okamoto et al. | |
| 5,982,898 A | 11/1999 | Hsu et al. | |
| 5,987,376 A | 11/1999 | Olson et al. | |
| 6,012,096 A | 1/2000 | Link et al. | |
| 6,016,505 A | 1/2000 | Badovinatz et al. | |
| 6,044,350 A | 3/2000 | Weiant, Jr. et al. | |
| 6,061,692 A | 5/2000 | Thomas et al. | |
| 6,078,948 A | 6/2000 | Podgorny et al. | |
| 6,081,845 A | 6/2000 | Kanemaki et al. | |
| 6,085,320 A | 7/2000 | Kaliski, Jr. | |
| 6,088,805 A | 7/2000 | Davis et al. | |
| 6,092,201 A | 7/2000 | Turnbull et al. | |
| 6,097,811 A | 8/2000 | Micali | |
| 6,108,687 A | 8/2000 | Craig | |
| 6,113,652 A * | 9/2000 | Lysik et al. | 717/170 |
| 6,128,740 A | 10/2000 | Curry et al. | |
| 6,134,658 A | 10/2000 | Multerer et al. | |
| 6,141,760 A | 10/2000 | Abadi et al. | |
| 6,143,383 A | 11/2000 | Giori | |
| 6,155,840 A | 12/2000 | Sallette | |
| 6,163,809 A | 12/2000 | Buckley | |
| 6,167,567 A * | 12/2000 | Chiles et al. | 717/173 |
| 6,173,277 B1 | 1/2001 | Ashby et al. | |
| 6,205,481 B1 | 3/2001 | Heddaya et al. | |
| 6,216,110 B1 | 4/2001 | Silverberg | |
| 6,237,025 B1 | 5/2001 | Ludwig | |
| 6,266,420 B1 | 7/2001 | Langford et al. | |
| 6,269,099 B1 | 7/2001 | Borella et al. | |
| 6,311,209 B1 | 10/2001 | Olson et al. | |
| 6,336,141 B1 | 1/2002 | Fujiyama et al. | |
| 6,351,813 B1 | 2/2002 | Mooney et al. | |
| 6,363,352 B1 | 3/2002 | Dailey et al. | |
| 6,470,375 B1 | 10/2002 | Whitner et al. | |
| 6,490,253 B1 | 12/2002 | Miller et al. | |
| 6,526,411 B1 | 2/2003 | Ward | |
| 6,529,950 B1 | 3/2003 | Lumelsky et al. | |
| 6,532,217 B1 | 3/2003 | Alkhatib et al. | |
| 6,557,054 B2 * | 4/2003 | Reisman | 710/33 |
| 6,560,636 B2 | 5/2003 | Cohen et al. | |
| 6,581,110 B1 | 6/2003 | Harif et al. | |
| 6,636,854 B2 | 10/2003 | Dutta et al. | |
| 6,636,889 B1 | 10/2003 | Estrada et al. | |
| 6,653,933 B2 | 11/2003 | Raschke et al. | |
| 6,654,796 B1 | 11/2003 | Slater et al. | |
| 6,658,568 B1 | 12/2003 | Ginter et al. | |
| 6,665,867 B1 * | 12/2003 | Ims et al. | 717/173 |
| 6,674,459 B2 | 1/2004 | Ben-Shachar et al. | |
| 6,675,205 B2 | 1/2004 | Meadway et al. | |
| 6,675,261 B2 | 1/2004 | Shandony | |
| 6,683,865 B1 | 1/2004 | Garcia-Luna-Aceves et al. | |
| 6,701,344 B1 | 3/2004 | Holt et al. | |
| 6,714,966 B1 | 3/2004 | Holt et al. | |
| 6,728,753 B1 | 4/2004 | Parasnis et al. | |
| 6,745,178 B1 | 6/2004 | Emens et al. | |
| 6,748,530 B1 | 6/2004 | Aoki et al. | |
| 6,754,829 B1 | 6/2004 | Butt et al. | |
| 6,775,782 B1 | 8/2004 | Buros et al. | |
| 6,791,582 B2 | 9/2004 | Linsey et al. | |
| 6,801,604 B2 | 10/2004 | Maes et al. | |
| 6,823,327 B1 | 11/2004 | Klug et al. | |
| 6,839,769 B2 * | 1/2005 | Needham et al. | 709/243 |
| 6,912,622 B2 | 6/2005 | Miller | |
| 6,920,455 B1 | 7/2005 | Weschler | |
| 6,938,042 B2 * | 8/2005 | Aboulhosn et al. | 707/10 |
| 6,961,764 B2 * | 11/2005 | Mizoguchi | 709/223 |
| 6,968,179 B1 | 11/2005 | DeVries | |
| 6,976,258 B1 | 12/2005 | Goyal et al. | |
| 6,981,043 B2 | 12/2005 | Botz et al. | |
| 6,983,400 B2 | 1/2006 | Volkov | |
| 6,990,514 B1 | 1/2006 | Dodrill et al. | |
| 7,062,681 B2 | 6/2006 | Larsson et al. | |
| 7,065,579 B2 | 6/2006 | Traversat et al. | |
| 7,065,587 B2 | 6/2006 | Huitema et al. | |
| 7,068,789 B2 | 6/2006 | Huitema et al. | |
| 7,073,132 B1 | 7/2006 | Rydahl et al. | |
| 7,130,999 B2 | 10/2006 | Yasala et al. | |
| 7,139,760 B2 | 11/2006 | Manion et al. | |
| 7,146,609 B2 * | 12/2006 | Thurston et al. | 717/169 |
| 7,159,223 B1 | 1/2007 | Comeau | |
| 7,181,620 B1 | 2/2007 | Hur | |
| 7,185,194 B2 | 2/2007 | Morikawa et al. | |
| 7,191,438 B2 * | 3/2007 | Bryant | 717/176 |
| 7,197,049 B2 | 3/2007 | Engstrom et al. | |
| 7,206,934 B2 * | 4/2007 | Pabla et al. | 713/168 |
| 7,213,060 B2 | 5/2007 | Kemp et al | |
| 7,272,636 B2 | 9/2007 | Pabla | |
| 7,299,351 B2 | 11/2007 | Huitema et al. | |
| 7,313,792 B2 * | 12/2007 | Buban et al. | 717/170 |
| 7,321,928 B2 * | 1/2008 | Feltin et al. | 709/223 |
| 7,415,439 B2 * | 8/2008 | Kontio et al. | 705/53 |
| 7,484,225 B2 * | 1/2009 | Hugly et al. | 719/330 |
| 7,499,981 B2 * | 3/2009 | Harrow et al. | 709/217 |
| 7,516,187 B2 * | 4/2009 | Kim et al. | 709/208 |
| 7,536,465 B2 * | 5/2009 | Teodosiu et al. | 709/229 |
| 7,567,987 B2 * | 7/2009 | Shappell et al. | 1/1 |
| 7,568,195 B2 * | 7/2009 | Markley et al. | 717/175 |
| 7,574,706 B2 * | 8/2009 | Meulemans et al. | 717/174 |
| 7,610,378 B2 * | 10/2009 | Teodosiu et al. | 709/225 |
| 7,716,286 B2 * | 5/2010 | Heins et al. | 709/204 |
| 7,739,240 B2 * | 6/2010 | Saito et al. | 707/634 |
| 7,805,719 B2 * | 9/2010 | O'Neill | 717/168 |
| 8,019,725 B1 * | 9/2011 | Mulligan et al. | 707/638 |
| 8,041,798 B1 * | 10/2011 | Pabla et al. | 709/223 |
| 8,225,304 B2 * | 7/2012 | Shahindoust et al. | 717/172 |
| 2001/0003191 A1 | 6/2001 | Kovacs et al. | |
| 2001/0035976 A1 | 11/2001 | Poon | |
| 2001/0053213 A1 | 12/2001 | Truong et al. | |
| 2002/0027567 A1 * | 3/2002 | Niamir | 345/738 |
| 2002/0073204 A1 | 6/2002 | Dutta et al. | |
| 2002/0078243 A1 | 6/2002 | Rich et al. | |
| 2002/0097267 A1 | 7/2002 | Dinan et al. | |
| 2002/0140730 A1 | 10/2002 | Linsey et al. | |
| 2002/0143989 A1 | 10/2002 | Huitema et al. | |
| 2002/0144149 A1 | 10/2002 | Hanna et al. | |
| 2002/0154172 A1 | 10/2002 | Linsey et al. | |
| 2002/0174422 A1 * | 11/2002 | Kelley et al. | 717/178 |
| 2002/0184358 A1 | 12/2002 | Traversat et al. | |
| 2002/0188657 A1 | 12/2002 | Traversat et al. | |
| 2002/0188881 A1 | 12/2002 | Liu et al. | |
| 2002/0191018 A1 | 12/2002 | Broussard | |
| 2002/0194484 A1 | 12/2002 | Bolosky et al. | |
| 2003/0009586 A1 * | 1/2003 | Harrow et al. | 709/238 |
| 2003/0009752 A1 * | 1/2003 | Gupta | 717/171 |
| 2003/0014485 A1 | 1/2003 | Banatwala | |
| 2003/0036941 A1 | 2/2003 | Leska et al. | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088544 A1 | 5/2003 | Kan et al. | |
| 2003/0097468 A1 * | 5/2003 | Hamadi | 709/238 |
| 2003/0126027 A1 | 7/2003 | Nelson et al. | |
| 2003/0135629 A1 | 7/2003 | Sasaki et al. | |
| 2003/0140119 A1 | 7/2003 | Acharya et al. | |
| 2003/0147386 A1 | 8/2003 | Zhang et al. | |
| 2003/0191753 A1 | 10/2003 | Hoch | |
| 2003/0196060 A1 | 10/2003 | Miller | |
| 2003/0217073 A1 | 11/2003 | Walther et al. | |
| 2003/0233455 A1 * | 12/2003 | Leber et al. | 709/226 |
| 2004/0039781 A1 * | 2/2004 | LaVallee et al. | 709/205 |
| 2004/0060044 A1 * | 3/2004 | Das et al. | 717/171 |
| 2004/0064693 A1 | 4/2004 | Pabla et al. | |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0100953 A1 | 5/2004 | Chen et al. | |
| 2004/0107242 A1 * | 6/2004 | Vert et al. | 709/203 |
| 2004/0111423 A1 | 6/2004 | Irving et al. | |
| 2004/0111469 A1 | 6/2004 | Manion et al. | |
| 2004/0111515 A1 | 6/2004 | Manion et al. | |

(56) References Cited

U.S. PATENT DOCUMENTS

| | | | |
|---|---|---|---|
| 2004/0111525 A1 | 6/2004 | Berkland et al. | |
| 2004/0117446 A1 | 6/2004 | Swanson | |
| 2004/0120344 A1 | 6/2004 | Sato et al. | |
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0133640 A1 | 7/2004 | Yeager et al. | |
| 2004/0141005 A1 | 7/2004 | Banatwala et al. | |
| 2004/0143603 A1 | 7/2004 | Kaufmann et al. | |
| 2004/0148333 A1 | 7/2004 | Manion et al. | |
| 2004/0148611 A1 | 7/2004 | Manion et al. | |
| 2004/0172455 A1 | 9/2004 | Green et al. | |
| 2004/0172456 A1 | 9/2004 | Green et al. | |
| 2004/0181487 A1 | 9/2004 | Hanson | |
| 2004/0184445 A1 | 9/2004 | Burne | |
| 2004/0202206 A1* | 10/2004 | Lee | 370/908 |
| 2004/0205243 A1 | 10/2004 | Hurvig et al. | |
| 2004/0221043 A1 | 11/2004 | Su et al. | |
| 2004/0236863 A1 | 11/2004 | Shen et al. | |
| 2004/0237081 A1* | 11/2004 | Homiller | 717/170 |
| 2004/0242329 A1 | 12/2004 | Blackburn et al. | |
| 2004/0249970 A1 | 12/2004 | Castro et al. | |
| 2004/0260761 A1 | 12/2004 | Leaute et al. | |
| 2004/0260771 A1 | 12/2004 | Gusler et al. | |
| 2004/0261071 A1* | 12/2004 | Chuang et al. | 717/170 |
| 2004/0264385 A1 | 12/2004 | Hennessey et al. | |
| 2004/0268344 A1* | 12/2004 | Obilisetty | 717/175 |
| 2005/0004984 A1 | 1/2005 | Simpson | |
| 2005/0005270 A1* | 1/2005 | Bucher et al. | 717/173 |
| 2005/0009537 A1 | 1/2005 | Crocker et al. | |
| 2005/0027805 A1 | 2/2005 | Aoki | |
| 2005/0038856 A1 | 2/2005 | Krishnasamy et al. | |
| 2005/0060432 A1 | 3/2005 | Husain et al. | |
| 2005/0066001 A1 | 3/2005 | Benco et al. | |
| 2005/0080768 A1 | 4/2005 | Zhang et al. | |
| 2005/0080859 A1 | 4/2005 | Lake | |
| 2005/0086300 A1 | 4/2005 | Yeager et al. | |
| 2005/0102245 A1 | 5/2005 | Edlund et al. | |
| 2005/0102356 A1 | 5/2005 | Manion et al. | |
| 2005/0114487 A1 | 5/2005 | Peng et al. | |
| 2005/0125529 A1 | 6/2005 | Brockway et al. | |
| 2005/0125560 A1 | 6/2005 | Brockway et al. | |
| 2005/0144080 A1* | 6/2005 | Crocitto | 705/26 |
| 2005/0171799 A1 | 8/2005 | Hull et al. | |
| 2005/0198173 A1 | 9/2005 | Evans | |
| 2005/0198493 A1* | 9/2005 | Bartas | 713/154 |
| 2005/0235038 A1 | 10/2005 | Donatella et al. | |
| 2006/0041882 A1* | 2/2006 | Shah | 717/171 |
| 2006/0064754 A1* | 3/2006 | Frank et al. | 726/23 |
| 2007/0169074 A1* | 7/2007 | Koo et al. | 717/168 |
| 2008/0031460 A1 | 2/2008 | Brookner et al. | |
| 2010/0191833 A1* | 7/2010 | Hofrichter et al. | 709/219 |
| 2011/0289495 A1* | 11/2011 | Mulligan et al. | 717/168 |
| 2013/0007098 A1* | 1/2013 | Averbuch et al. | 709/203 |

FOREIGN PATENT DOCUMENTS

| | | |
|---|---|---|
| JP | 10149398 A | 6/1998 |
| JP | 11205331 A | 7/1999 |
| JP | 11265369 A | 9/1999 |
| JP | 2000151715 A | 5/2000 |
| JP | 2002197246 A | 7/2002 |
| JP | 2002281086 A | 9/2002 |
| JP | 2002335269 A | 11/2002 |
| WO | 0120450 A2 | 3/2001 |
| WO | 2005046164 A1 | 5/2005 |

OTHER PUBLICATIONS

Erdelsky, P., The Birthday Paradox, EFG, at http://www.efgh.com/math/birthday.htm (Mar. 8, 2002).

Red-Black Tree, National Institute of Standards and Technology, at http://www.nist.gov/dads/HTML/redblack.html (Mar. 5, 2002).

Ellison, C., et al., Simple Public Key Certificate, (Internet Draft 1999), at http://www.world.std.com/~cme/spki.txt (Aug. 6, 2001).

Rowstron et al., Storage management and caching in PAST, a large-scale, persistent peer-to-peer storage utility, at Microsoft Research, Ltd., St. George House and Rice University, 14 pages.

Rowstron et al., SCRIBE: The design of a large-scale event notification infrastructure, at Microsoft Research, Ltd., St. George House and Rice University, 20 pages.

Rowstron et al., Pastry: Scalable, distributed object location and routing for large-scale peer-to-peer systems, at Microsoft Research, Ltd., St. George House and Rice University, 20 pages.

Lai, K. et al., Measuring Link Bandwidths Using a Deterministic Model of Packet Delay, at Department of Computer Science at Stanford University, 13 pages.

Langley, A., The Freenet Protocol, The Free Network Project, at http://freenet.sourceforge.net/index/php?page=protocol (May 21, 2001).

Dabek, F., et al.,Building Peer-to-Peer Systems With Chord, a Distributed Lookup Serivce, at MIT Laboratory for Computer Science, 6 pages, at http://pdos.lcs.mit.edu/chord.

Ellison, C., SPKI Requirements, (The Internet Society 1999), at http://www.ietf.org/rfc/rfc2692.txt?number=2692 (Aug. 6, 2001).

Ellison, C., et al., SPKI Certificate Theory, (The Internet Society 1999), at http://www.ietf.org/rfc/rfc2693.txt?number=2693 (Aug. 6, 2001).

U.S. Appl. No. 10/810,381, filed Mar. 26, 2004, Manion, Todd R., et al.

Groove Networks, Customers: Case Studies; www.nps.navy.mil.

Bit Torrent; "What is BitTorrent?" Copyright 2001-2005 BitTorrent, Inc.

Microsoft Corporation; "Introduction to Windows Peer-to-Peer Networking," Published: Jan. 2003.

"JXTA Overview", Jan Newmarch, Oct. 7, 2002, reprinted from the Internet at: http://jan.newmarch.name/distjava/jxta/jxta.html, 14 pgs.

"Microsoft Computer Dictionary", Fifth Edition, Microsoft Press, 2002, two coverpages and pp. 31, 238-239, 424 and 467 (total 7 pgs.).

"At what cost pervasive? A social computing view of mobile computing systems", 2000, D. C. Dryer, IBM Systems Journal, vol. 38, No. 4, 1999, Pervasive Computing, 28 pgs.

"Design Explorations—What ti Means to Design", IBM Research, Social Computing Group, reprinted from the Internet at: http://www.research.ibm.com/SocialComputing/SCGdesign.html, on Apr. 19, 2005, 4 pgs.

"IBM Lotus Instant Messaging and Web Conferencing", Mar. 30, 2004, Reprinted from the Internet at: http://www-01.ibm.com/common/ssi/cgi-bin/ssialias? subtype=ca&infotype=an&appname=iSource&supplier=897&letternum=ENUS204-049, 3 pgs.

"IBM Workplace Collaboration Services Overview Guide", Jan. 2005, reprinted from the Internet at: ftp://ftp.lotus.com/lotusweb/IBM_Workplace_Collaboration_Services_g224733301_118.pdf, 2 pgs.

The Gnutella Protocol Specification, v0.4(1), 2004, Reprinted from the Internet at: http://alumni.cs.ucr.edu/~csyiezti/courses/cs260-2/gnutelle/GnutellaProtoco104.pdf, 10 pgs.

"P2P Search that Scales", L ADAMIC, pre=presentation description for talk on Nov. 7 2001, printed from the Internet at: http://conferences.oreillynetcomics/p2pweb2001/view/e_sess/1702, 1 pg.

"Virtual Social Clubs: Meeting Places for the Internet Community", 1999, IEEE International Conference on Multimedia Computing and Systems, 4 pgs.

"Supporting Sociability in a Shared Browser", Shelly Farnham, Melora Zaner and Lili Cheng, in Proceedings of Interact Conference (Tokyo, Japan, Jul. 2001), 8 pgs.

"Distributed Peer-to-Peer Name Resolution", Christian Huitema, Presentation Slides from the O'Reilly Peer-to-Peer and Web Services Conference, Nov. 5, 2001, reprinted from the Internet at: http://www.slideshare.net/networkingcentral/distributed-peertopeer-name-resolution, 19 pgs.

"A GPS-based Peer-to-Peer Hierarchical Link State Routing for Mobile Ad Hoc Networks", Mario Joa-Ng and I-Tai Lu, IEEE 51st Vehicular Technology Conference Proceedings, vol. 3, 2000, pp. 1752-1756.

(56) References Cited

OTHER PUBLICATIONS

"A Peer-to-peer Zone-Based Two-Level Link State Routing for Mobile Ad Hoc Networks", NARIO Joa-Ng and I-Tai Lu, IEEE Journal on Selectged Areas in Communications, vol. 17, No. 8, 2000, pp. 1415-1425, 14 pgs.

"Managing the Virtual Commons: Cooperation and Conflict in Computer Communities", Peter Kollock and Marc Smith, in Computer-Mediated Communication:Linguistic, Social and Cross-Cultural Perspectives, 1996, 23 pgs.

"An Efficient Peer-to-Peer File Sharing Exploiting Hierarchy and Asymmetry", Gisik Kwon and Kyung D. Ryu, Proceedings of the 2003 Symposium on Applications and the Internet, 2003, 9 pgs.

MeetingMaker-Meeting Maker printout, Reprinted from the Internet at: http://www.meetingmaker.com/products/meetingmaker/default.cfm on Jul. 1, 2005, 2 pgs.

MeetingMaker-WebEvent Publish printout, 2005, Reprinted from the Internet at: http://www.meetingmaker.com/products/webevent_publish/default.cfm, 2 pgs.

"DataStructures and Algorithms", Sections 8.3, J. Morrie, Online Publication 1998, Reprinted from the Internet at: http://www.eecs.wsu.edu/~cook/aa/lectures/applets/h/hash_tables.html, 4 pgs.

"Presence and Awareness Service", Ramiro Liscano, Jun. 11, 2003, reprinted from the Internet at: http://www.site.uottawa.ca/fiw03/pres/Liscano.pdf, 89 pgs.

"Discovering Semantic Web Services in Dynamic Environments", 2005, Tommy Gagnes, Thomas Piagemann and Ellen Munthe-Kaas, Norwegian Defence Research Establishment (FFI), University of Oslo, Department of Informatics, Oslo, Norway, Discovering Semantic Web Services in Dynamic Environments, published as a short paper at the IEEE European Conference on Web Services (ECOWS), 4 pgs.

"Designing User Interfaces for Collaborative Web-Based Open Hypermedia", Niels Olof Bouvin, 2000, in Proceedings of the Eleventh ACM Conference on Hypertext and Hypermedia, 3 pgs.

"SIP: Session Initiation Protocol", M Handley, H Schulzrinne, E. Schooler and J. Rosenberg, Mar., 1999, Network Working Group, Request for Comments 2543, reprinted from the Internet at: http://tools,jeff.org/hjtml/rfc3542, 153 pgs.

"Topology-aware routing in structured peer-to-peer overlay networks", Miguel Castro, Peter Druschel, Y. Charlie Hu and Antony Rowstron, Sep., 2002, Technical Report MSR-TR-2002-82, Microsoft Research, Microsoft Corporation, reprinted from the Internet at: http://www.research.microsoft.com, 19 pgs.

"Using a Room Metaphor to East Transitions in Groupware", Saul Greenberg and Mark Roseman, Jan. 2003, University of Calgary, Department of Computer Science, Research Report 98.611.02, 33 pgs.

Japanese Office Action cited in Japanese Application No. 2003-403827 dated Jan. 22, 2010, 6 pgs.

Japanese Final Office Action cited in Japanese Application No. 2003-403827 dated Oct. 26, 2010, 2 pgs.

EP Communication cited in EP Application No. 0326960.9 dated Jun. 11, 2010, 4 pgs.

EP Notice of Allowance cited in EP Application No. 0326960.9 dated May 24, 2012, 8 pgs.

Non-Final Office Action cited in U.S. Appl. No. 10/309,865 dated Mar. 3, 2006, 30 pgs.

Reply Non-Final Office Action cited in U.S. Appl. No. 10/309,865 dated Jun. 2, 2006, 41 pgs.

Non-Final Office Action cited in U.S. Appl. No. 10/309,865 dated Feb. 23, 2007, 18 pgs.

Reply Non-Final Office Action cited in U.S. Appl. No. 10/309,865 dated Jul. 13, 2007, 37 pgs.

Final Office Action cited in U.S. Appl. No. 10/309,865 dated Nov. 15, 2007, 17 pgs.

Appeal Brief cited in U.S. Appl. No. 10/309,865 dated Feb. 25, 2008, 69 pgs.

Notice of Allowance cited in U.S. Appl. No. 10/309,865 dated May 22, 2008, 16 pgs.

Non-Final Office Action cited in U.S. Appl. No. 10/351,905 dated Oct. 3, 2006, 8 pgs.

Reply Non-Final Office Action cited in U.S. Appl. No. 10/351,905 dated Jan. 3, 2007, 25 pgs.

Non-Final Office Action cited in U.S. Appl. No. 10/351,905 dated Mar. 9, 2007, 8 pgs.

Reply Non-Final Office Action cited in U.S. Appl. No. 10/351,905 dated Jun. 11, 2007, 27 pgs.

Final Office Action cited in U.S. Appl. No. 10/351,905 dated Oct. 31, 2007, 9 pgs.

Amendment after Final cited in U.S. Appl. No. 10/351,905 dated Oct. 23, 2007, 34 pgs.

Advisory Action cited in U.S. Appl. No. 10/351,905 dated Oct. 31, 2007, 3 pgs.

Non-Final Office Action cited in U.S. Appl. No. 10/351,905 dated Jan. 17, 2008, 10 pgs.

Rely Non-Final Office Action cited in U.S. Appl. No. 10/351,905 dated Apr. 17, 2008, 56 pgs.

Final Office Action cited in U.S. Appl. No. 10/351,905 dated Jul. 31, 2008, 12 pgs.

Appeal Brief cited in U.S. Appl. No. 10/351,905 dated Dec. 17, 2008, 70 pgs.

Notice of Allowance cited in U.S. Appl. No. 10/351,905 dated May. 20, 2009, 10 pgs.

Amendment after NOA cited in U.S. Appl. No. 10/351,905 dated Jun. 22, 2009, 24 pgs.

Notice of Allowance cited in U.S. Appl. No. 10/810,917 dated Jul. 8, 2008, 13 pgs.

"Chord: A Scalable Peer-to-Peer Lookup Service for Internet Applications", ION Stoica, Robert Morris, David Karger, M. Frans Kaashoek and Hari Balakrishnan, MIT Technical Report, SIGCOMM '01, Aug. 27-31, 2001 San Diego, California, 12 pgs.

"A Desktop Design for Synchronous Collaboration" Bogdan Dorohoneceanu and Ivan Marsic, in Proceedings of the Graphics Interface '99 (GI'99), Kingston, Ontario, Canada, Jun. 1999, 9 pgs.

Advanced Peer-to-Peer Network Platform for Various Services—SIONet (Semantic Information Oriented Network), Hiroshi Sunaga, Michiharu Takemoto and Tetsuya Iwata, Proceedings fo the Second International Conference on Peer-to-Peer Computing, IEEE, 2002, 2 pgs.

"A Measurement Study of Peer-to-Peer File Sharing Systems", Stefan Saroju, P. Krishna Gummadi and Steven D. Gribble, Appeared in Proceedings of the Multimedia Computing and Networking (MMCN), San Jose, Jan. 2002, 15 pgs.

"A Scalable Content-Addressable Network", Sylvia Ratnasamy, Paul Francis, Mark Handley, Richard Karp and Scott Shenker, SIGCOMM '01, Aug. 27-31, 2001, San Diego, California, ACM, pp. 161-172.

"A Unified Peer-to-Peer Database Framework for Scalable Service and Resource Discovery", Wolfgang Hoschek, Published in Proceeding GRID '02 Proceedings of the Third International Workshop on Grid Computing, 2002, 14 pgs.

"A Web Based Multi-display Presentation System", Frank Zhao and Qiong Liu, MM '04 ACM, Oct. 10-16, 2004, New York, New York, 2 pgs.

"BOOTP Vendor Information Extensions", Network Working Group, Jan. 1993, reprinted from the Internet at: http://www.faws.org/rfc/rfc1395.txt, 8 pgs.

"Collaborative Interfaces for the Web", Saul Greenberg, in Human Factors and Web Development, Chapter 18, LEA Press, 1997, pgs. 241-253.

"Connecting and Extending Peer-to-Peer Networks", Lion Share White Paper, Oct. 2004, 35 pgs.

"Dynamic Group Support in LANMAR Routing Ad Hoc Networks", Xiaoyan Hong, Nam Nguyen, Shaorong Liu and Ying Teng, IEEE, 2002, 5 pgs.

"Early Measurements of a Cluster-based Architecture for P2P Systems", Balachander Krishnamurthy, Jia Wang and Yinglian Xie, ACM SIGCOMM Internet Measurement Workshop 2001, 5 pgs.

"Extending a Collaborative Architecture to Support Emotional Awareness", Octavio Garcia, Jesus Favela, Guillermo Licea and Robert Machorro, EBAA '99, Workshop on Emotion-Based Agent Architectures, May 1999, 7 pgs.

(56) References Cited

OTHER PUBLICATIONS

"Freenet: A Distributed Anonymous Information Storage and Retrieval System", Ian Clarke, Oskar Sandbert, Brandon Wiley and Theodore W. Hong,H. Federrath (Ed.), 2001, reprinted from the Internet at: http://snap.stanford.edu/class/cs224w-readings/clarke00freenet.pdf, 21 pgs.

"Hutchworld: Lessons Learned A Collaborative Project: Fred Hutchsinson Cancer Research Center & Microsoft Research", Lili Cheng, Linda Stone, Shelly Farnham Ann Marie Clark and Melora Zaner, in Proceedings of Second International Conference on Virtual Worlds (VW 2000), Paris, France, Jul. 2000, pp. 1-12.

"Internet Routing Instability", Craig Labovitz, G. Robert Malan and Farnam Jahanian, Appears in the Proceedings of the ACM SIGCOMM 1997, 12 pgs.

"Meteor-S Web Service Discovery Infrastructure", A Component of the METEOR-SW System on Semantic Web Services and Processes: METEOR-S Web Service Discovery Infrastructure (MWSDI), dated Dec. 14, 2005, reprinted from the Internet at: http://lsdis.cs.uga.edu/projimeteor/mwsdi.html, 2 pgs.

"Microsoft Overhauls Longhorn Drivers for Usability, Connectivity", eWeek.com Enterprise News & Reviews, dated Dec. 14, 2005, reprinted from the Internet at: http://www.eweek.com/article2/0,1759,1654462,00.asp, 3 pgs.

"Microsoft, Groove Networks to Combine Forces to Create Anytime, Anywhere Collaboration", Microsoft PresspassInformation for Journalists, Mar. 10, 2005, reprinted from the Internet at: http://www.microsoft.com/prespass/features/2005/mar05/03-10GrooveQA.asp, 5 pgs.

"On Reliable and Scalable Peer-to-Peer Web Document Sharing", Li Xiao, Xiaodong Zhang and Zhichen Xu, Proceedings of 2002 International Parallel and Distributed Processing Symposium (IPDPS '02), IEEE, 8 pgs.

"Pastry: Scalable, decentralized object location and routing for large-scale peer-to-peer systems", Antony Rowstrom and Peter Druschel, Appears in Proc. of the 18th IFIP/ACM International Conference on Distributed Systems Platforms, Heidelberg, Germany, Nov. 2001, 22 pgs.

"Peer-to-Peer Architectures and the Magi Open Source Infrastructure", G. Bolcer, Endeavors Technology, Inc. Dec. 6, 2000, reprinted from the Internet at: http://65.54.113.26/Publication/35458495/peer-to-peer-architectures-and-the-magi-open-source-infrastructure, 2 pgs.

"Peer-To-Peer for Collaborative Applications", Gianpaolo Cugola and Gian Pietro Picco, in Proceedings of the 22nd International Conference on Distributed Computing Systems Workshops (ICDCS '02), Vienna, Austria, Jul. 2-5, 2002, 6 pgs.

"Project JXTA: Technical Specification Version 1.0", Sun Microsystems, Inc., Apr. 25, 2001, reprinted from the Internet at: http://www.cs.unibo.it/babaoglu/courses/cas00-01/papers/P2P/JXTA-Spec.pdf, 26. pgs.

"Project JCTA: An Open, Innovative Collaboration", Sun Microsystems, Inc., Apr. 25, 2001, reprinted from the Internet at: http://www.utdallas.edu/~ilyen/course/grid/papers/jxta/jxta-collaboration.pdf,7 pgs.

Project JXTA: A Technology Overview, Li Gong, Sun Microsystems, Inc. Apr. 25, 2001, reprinted from the Internet at: http://docs.google.com/viewer?a=v&q=cache:xFFkjw8G7wIJ:ftp:jano.ucauca/edu.co/cursos/Memorias/CITA2002/JITT-Docuentos/Ubicua2/Fuentes/Papers/TechOverview.pdf, 12 pgs.

"Project JXTA: Virtual Network", Bernard Traversat and Mohamed Abdelaziz, Mike Duigou, Jean-Christophe Hugly, Eric Pouyoul and Bill Yeager, Sun Microsystems, Inc. Oct. 28, 2002, 10 pgs.

"Publications related to Pastry", Dec. 24, 2001, reprinted from the Internet at: http://research.microsoft.com/en-us/umlpeople/antr/pastry/pubs.htm, 2 pgs.

"Secure routing for structured peer-to-peer overlay networks", Miguel Castro, Peter Druschel, Ayalyadi, Ganesh, Antony Rowstron and Dan S. Wallach, Uneix.OSDI '02 Paper (OSDI '02 Tech Program Index), the Proceedings, Fifth Symposium on Operating Systems Design and Implementation (OSDI 2002), 33 pgs.

"Supporting Multi-User, Multi-Applet Workspaces in CBE", Jang Ho Lee, Atul Prakash, Trent Jaeger and Gwobaw Wu, in Proceedings of the ACM 1996 Conference on Computer Supported Cooperative Work, Cambridge, MA, 1996, 10 pgs.

"Tapestry: An Infrastructure for Fault-tolerant Wide-area Location and Routing", Ben Y. Zhao, John Kubiatowicz and Anthony D. Joseph, Report No. UCB/CSD-01-1141, Computer Science Division (EECS), University of California, Berkeley, California, 2001, 28 pgs.

"The Cost of Peer Discovery and Searching in the Gnutella Peer-to-Peer File Sharing Protocol", Marius Portmann, Pipat Sookavatana, Sebastien Ardon and Aruna Seneviratne, Proceedings Ninth IEEE International Conference on Networks, 2001, pp. 263-268.

"The Economies of Online Cooperation: Gifts and Public Goods in Cyberspace", Peter Kollock, in Communities in BCyberspace, (Smith et al. ids.) Routledge, London, UK, 1999, pp. 1-16.

"The Social Life of Small Graphical Chat Spaces", Marc A. Smith, Shelly D. Farnham and Steven M. Drucker, in Proceedings of the SIGCHI Conference on Human Factors in Computing Systems, The Hague, Netherlands, Mar. 2000, reprinted from the Internet at: http://research.microsoft.com/scg/papers/vchatchi2000.pdf, 8 pgs.

"Chatopus for Palm OS, Using IM Bots for Jabber", Tony Cheung, Chatopus, Chatopus-Palm OS Instant Messaging Client for XMPP/Jabber, Oct. 20, 2002, reprinted from the Internet at: http://www.chatopus.com/articles/bots.html, 5 pgs.

"Using Network-level Support to Improve Cache Routing", Ulana Legedza and John Guttag, Computer Networks and ISDN Systems: The International Journal of Computer and Telecommunications Networking, vol. 30, No. 22-23, 1998, 8 pgs.

Web Services Dynamic Discovery (WS-Discovery), John Beatty, Gopal Kakivaya, Devon Kemp, Thomas Kuehnet, Brad Lovering, Bryan Roe, Christopher St. John, Jeffrey Schlimmer, Guillaume, Simonnet, Doug Walter, Jack Weast, Yevgeniy Yarmosh, and Prasad Yendluri, Microsoft Corporation, Apr. 2005, reprinted from the Internet at: http://msdn.microsfot.com/en-uslibrary/bb706924(d=printer).aspx, 42 pgs.

"Workspace Awareness in Real-Time Distributed Groupware", Carl Gutwin, The University of Calgary, department of Computer Science PhD. Thesis, Dec. 1997, reprinted from the Internet at: http://hci.usask.ca/publications/1997/gutwin-phd.pdf, 292 pgs.

Algorithms in C, Third Edition, Parts 1-4, Fundamentals, Data Structures, Sorting, Searching, Robert Sedgewick, 1998, part of Chapter 16, External Searching, pp. 662-692.

Algorithms in C, Third Edition, Parts 1-4, Fundamentals, Data Structures, Sorting, Searching, Robert Sedgewick, 1998, Chapter 14, Hashing, pp. 573-608.

Peer-to-Peer, Harnessing the Power of Disruptive Technologies, Lawrence Lessig, Mar. 2001, Chapter 8, Gnutella, pp. 94-122.

"Products: Groove Virtual Office FAQ", Groove Networks, reprinted from the Internet at: http://www.groove.net/index.cfm?pagename=VO_FAQ, May 31, 2005, 5 pgs.

"Products: Groove Virtual Office", Groove Networks, reprinted from the Internet at: http://www.groove.net/index.cfm/pagename/VirtualOffice, May 31, 2005, 2 pgs.

"Products: Why Groove", Groove Networks, reprinted from the Internet at: http://www.groove.net/index/cfm?pagename=Products_Overview, May 31, 2005, 2 pg.

"News: Sun Incorporating JXTA into Products", java.net the Source for Java Technology Collaboration, Jan. 30, 2004, reprinted from the Internet at: http://today.java.net/pub/n/SunJXTA, 1 pg.

"AOL vs. Microsoft vs. All of Us", Cathryn Baskin, PC World, vol. 17, No. 10, ProQuest Computing, Oct. 1999, p. 19.

"Computer Networks", Andrew S. Tanenbaum, Third Edition, Prentice Hall PTR, 1996, pp. 437-449.

"Microsoft Computer Dictionary", Fifth Edition, Microsoft Press, 2002, pp. 31, 238-239, 424 and 467.

"Project JXTA: Technical Shell Overview", Apr. 25, 2011, Sun Microsystems, Inc., reprinted from the Internet at: http://www.jxta.org/project/www/docs/TechShellOverview.pdf, 12 pgs.

"About Presentation Broadcasting", Jul. 1, 2005, reprinted from the Internet at: http://office.microsoft.com/en-us/assistance/HP052411931033.aspx, 1 pg.

"The Cost of Application-level Broadcast in a Fully Decentralized Peer-to-Peer Network", Marius Portmann and Aruna Seneviratne,

(56) References Cited

OTHER PUBLICATIONS

2002, Proceedings of the Seventh International Symposium on Computer and Communications, 6 pgs.

"QuickTime Broadcaster", Jul. 1, 2005, reprinted from the Internet at: http://www.apple.com/quicktime/extending/resources.html, 1 pg.

"A Generic System for Web-Based Group Interaction", Karein Schmidt, Peter Manhart and Johannes Bumiller, Jan. 6-9, 1998, Proceedings of the Thirty-First Hawaii International Conference on System Sciences, vol. 1, 10 pgs.

"SlidesNow!", Jul. 1, 2005, reprinted from the Internet at: http://www.slidesnow.com/about.shtml, 2 pgs.

"How the Old Napster Worked", Jeff Tyson, Apr. 20, 2013, reprinted from the Internet at: http://computer.howstuffworks.com/napster.htm, 3 pgs.

\* cited by examiner

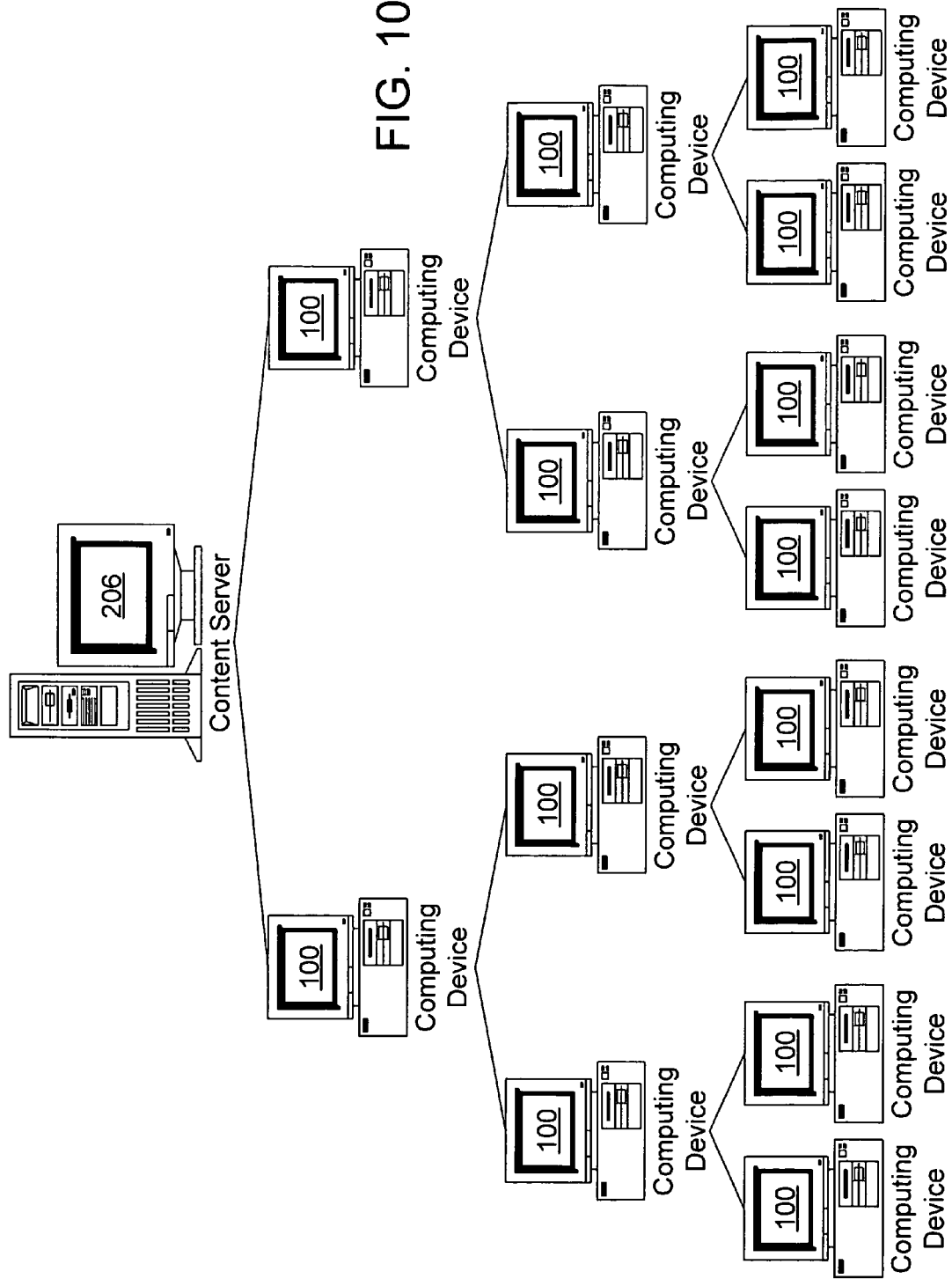

METHOD FOR EFFICIENT CONTENT DISTRIBUTION USING A PEER-TO-PEER NETWORKING INFRASTRUCTURE

TECHNICAL FIELD

The present invention relates generally to the distribution of content in a computer network and, more particularly, to methods for efficiently distributing content using a peer-to-peer networking infrastructure.

BACKGROUND OF THE INVENTION

Traditionally, the task of distributing content over a network to a client computing device has been one that is highly server-intensive. In the typical model, the clients will connect to a server to receive content directly from the server on an individual basis. In the case of a large enterprise installation, for instance, this model implies that every client is required to connect to the server to receive data from it making it very difficult for the server to handle such large amounts of simultaneous requests for data.

A server-only content distribution model can also present problems with respect to bandwidth availability. With the advent of affordable and easily maintainable home networking equipment it is becoming more common for several computers in a household, or residential area, to share a single broadband or dial-up connection. A household having five computers, for example, may need to download software (e.g., patches, product upgrades, etc.) from a central server (e.g., windowsupdate.com) to each computer. Since there is a single point of receipt from outside the home network, if all five computers, or even less than all five, are requesting the same content at overlapping times the computers will be splitting the available bandwidth of the connection while receiving the same content.

Not only does a server-based content distribution solution have drawbacks in the enterprise and home settings but also in the internet setting as well. For example, the interconnected nature of the Internet has, among other things, accelerated the spread of computer viruses and worms. Unfortunately, virus cleansing and repair remains a reactionary process whereby the necessary virus definition files are distributed upon identification of the virus "in the wild." Time is therefore of the essence in distributing the virus definition files to stanch the spread of the virus. When a new virus is first identified, the virus definition distribution servers can become overloaded with requests or could even be made unavailable (e.g., through a denial of service attack or some similar nefarious method) as part of the scheme to propagate the spread of the virus. A solution where the virus definitions are obtained only from a centralized server on the internet fails to safeguard against this eventuality and additionally fails to provide a method whereby the virus definitions can be distributed to the maximum number of computers in the most efficient fashion.

One potential solution to the problems described above is to use a series of redundant content distribution servers that may serve to distribute the load of demand over a number of servers. Such a solution however has several drawbacks. First, server hardware and software, and in particular the type of server hardware and software needed for intensive data delivery tasks, is typically expensive and requires experienced administration resources. Additionally, such a solution only scales in a linear fashion. For example, suppose 1,000 clients are currently receiving their content from a single server. Adding one more content distributing server reduces the average number of clients to a server to 500. Adding a third reduces this number to approximately 333, and so on. Thus a significant number of servers must be added to reduce the number of clients receiving content from a particular server to desired or manageable levels. Finally, a further drawback to this solution is that the content to be distributed and the distribution ability will always remain solely on the servers and hence only available in a limited fashion.

SUMMARY OF THE INVENTION

In view of the foregoing, the present invention provides a method for efficiently distributing content by leveraging the use of a peer-to-peer network infrastructure. Peer-to-peer networking provides an infrastructure that enables computing devices to communicate and share information securely with one another without the need of a server or other third party to facilitate the communication. A peer-to-peer networking infrastructure can be effectively employed to improve the efficiency of content distribution and the corresponding scalability. In a network of peers, a handful of the peers can receive content from centralized servers. These peers can then flood this content out to a few more peers who in turn can send the content along to others. Ultimately, this method produces a result whereby a request for content can be fulfilled by locating the closest peer and obtaining the content from that peer.

In one embodiment the above method can be used to distribute content over the Internet or within an enterprise installation by creating content distribution groups of one or more computing devices that are also peers in one or more peer-to-peer networks. Content requests on the server can then be redirected to a content distribution group for distribution to peers to reduce load on the centralized content distribution server.

A further contemplated embodiment efficiently streams time sensitive content through the use of a spanning tree architecture of peer-to-peer clients. On-line meeting materials or webcast concerts or similar time sensitive content can be distributed in a highly efficient manner by geometrically increasing the amount of content distributing computing devices over time.

In yet another embodiment the present invention provides for more efficient use of bandwidth in home networks or shared residential broadband or dial-up connections. In a peer-to-peer content distribution scenario one client computing device can download content over the connection while the other computing devices can simply obtain the content from the peer that downloaded it, thereby eliminating the need for bandwidth to be used by multiple client computing devices in downloading the same content.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 10 is a schematic diagram showing an implementation of content distribution leveraging a peer-to-peer networking infrastructure for an enterprise installation.

DETAILED DESCRIPTION OF THE INVENTION

Figure 1:
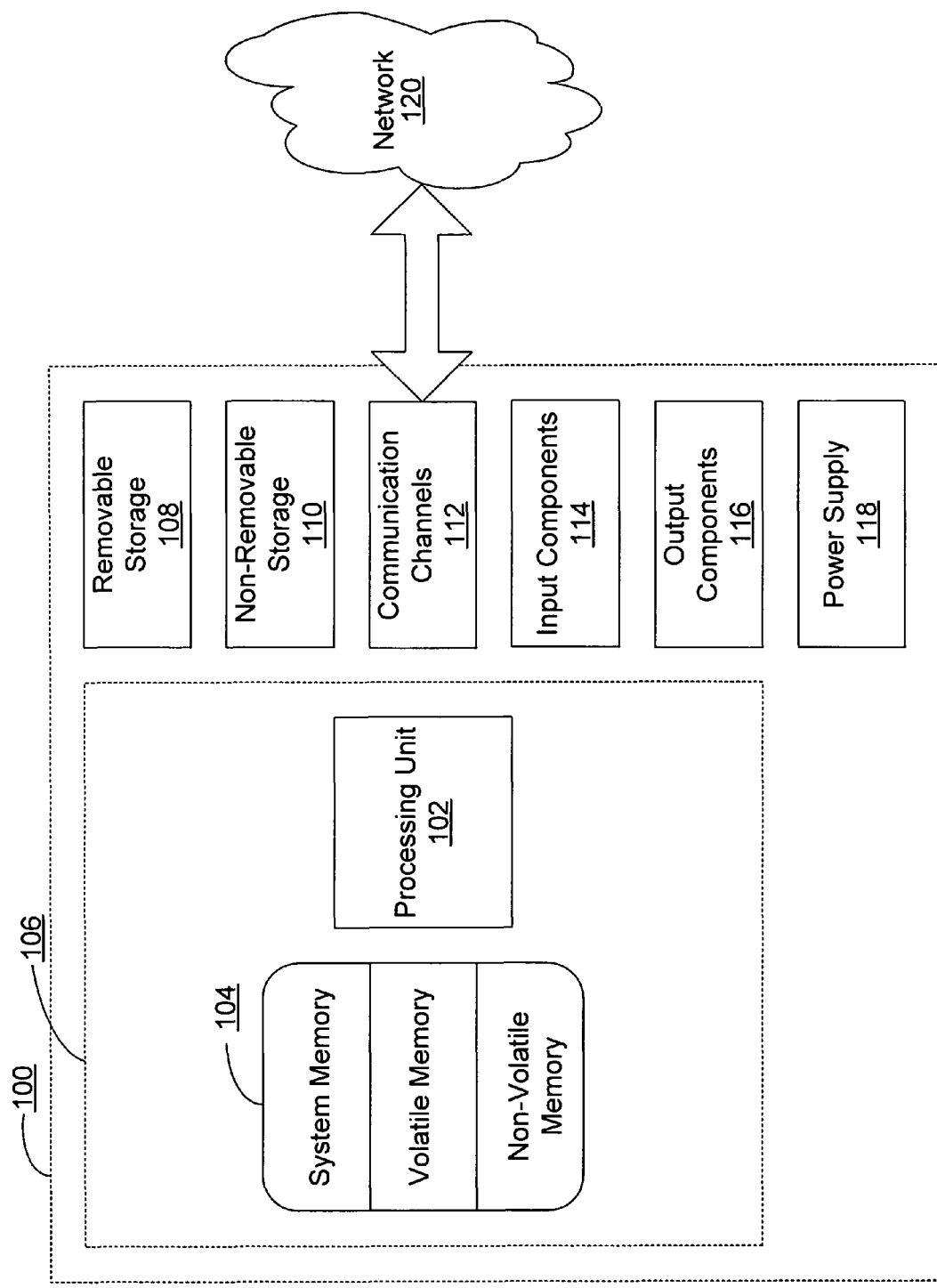
FIG. 1 is a schematic diagram of an exemplary computer architecture on which the method of the invention can be implemented.

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable networking environment. The following description is based on illustrated embodiments of the invention and should not be taken as limiting the invention with regard to alternative embodiments that are not explicitly described herein.

I. Exemplary Environment

Referring to FIG. 1, the present invention relates to communications between network nodes on connected networks. Each of the network nodes resides in a device that may have one of many different computer architectures. For descriptive purposes, FIG. 1 shows a schematic diagram of an exemplary architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Server-Based Content Distribution

Figure 2:
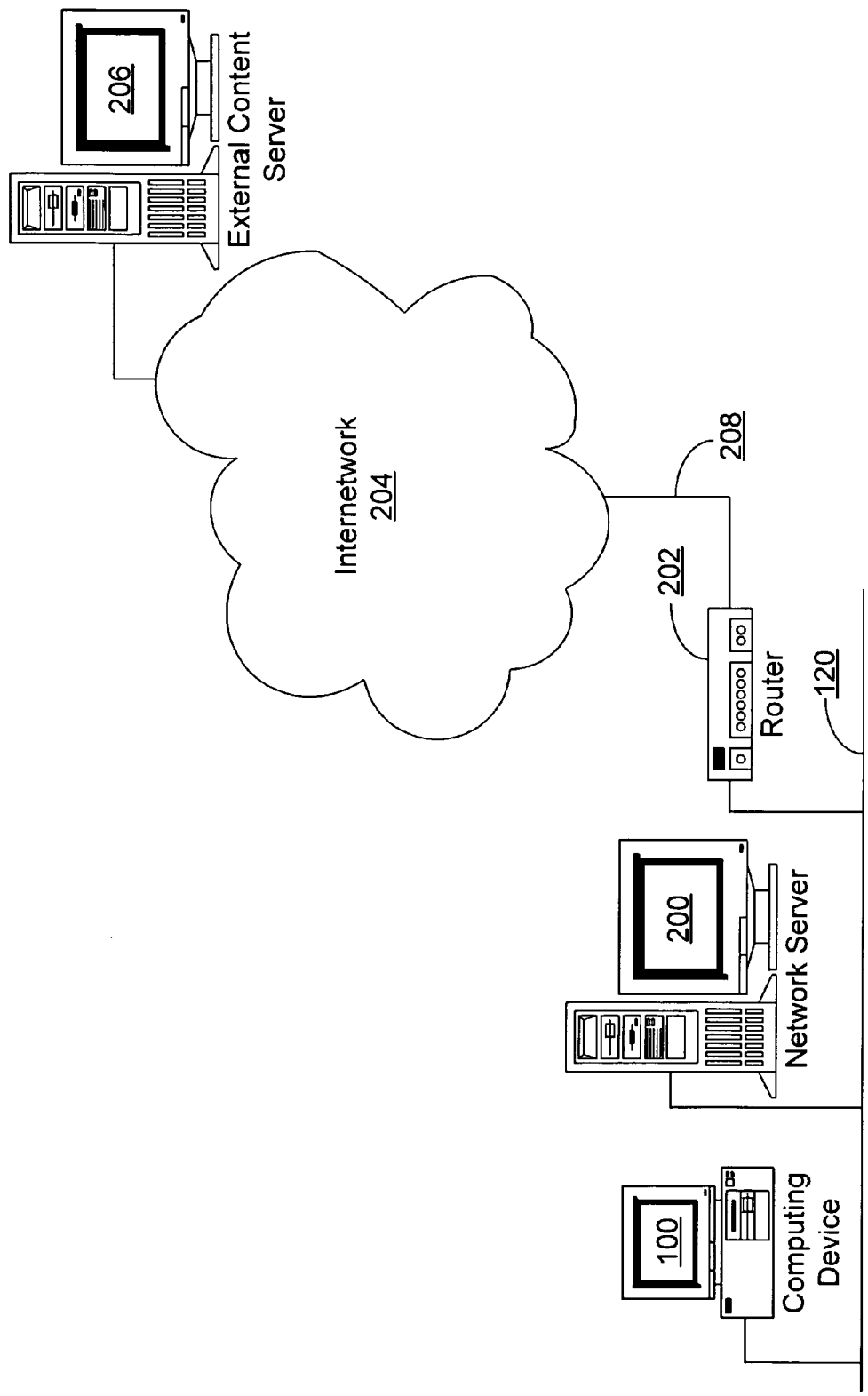
FIG. 2 is a schematic diagram showing an exemplary communications network in which the method of the invention can be practiced.

The present invention is directed to methods for efficiently distributing content over computer networks. Referring to FIG. 2, an exemplary communications network architecture is illustrated. Accompanying a computing device 100 on a local area network (LAN) 120 is a server 200 and a router 202. The router 202 allows the devices on the LAN 120 to communicate over an internetwork 204 to remote computing devices 206. The Internet is one example of an internetwork. In the present example, the server 200 can be a network server which the computing device 100 may access for content distribution over the LAN 120 and the remote computing device can be a remote content distribution server which the computing device may access for content distribution over the Internet 204 or similar wide area network (WAN).

Traditionally, the task of distributing content over a network 120 to a client computing device 100 has been one that is highly server-intensive. In the typical model, the clients 100 will connect to a server 200, 206 to receive content directly from the server 200, 206 on an individual basis. In the case of a large enterprise installation, for instance, this model implies that every client 100 is required to connect to the internal network server 200 to receive content (e.g., data) from it making it very difficult for the server to handle large amounts of simultaneous requests for content. In the case of a home network or similar shared residential broadband or dial-up connectivity scenario, this model implies that every computer 100 sharing the connection 208 is required to connect to the external content server 206 to receive data from it, thereby splitting the available bandwidth of the connection 208 when requests are made by the computing devices 100 at overlapping times. External content servers 206 exposed on the Internet can become overloaded when there is a spike in requests for time sensitive content regardless of whether the requests are originating from inside an enterprise installation or residential gateway. In addition, the server based content distribution model may fail to provide content availability contingency scenarios for periods of server unavailability. Attempts to address the limitations of server-based content distribution have focused on additional server redundancy, however such solutions do not scale well under severe demand and are generally not cost effective.

III. Peer-To-Peer Networking Infrastructure

The present invention leverages the use of a peer-to-peer network infrastructure for efficient content distribution. In the description that follows the invention is described as being implemented over a peer-to-peer network infrastructure such as the Windows® Peer-to-Peer Networking Infrastructure by Microsoft of Redmond, Wash. As will be appreciated by one of ordinary skill in the art, the network infrastructure should be understood to include any network infrastructure possessing the necessary communications and security protocols.

Figure 3:
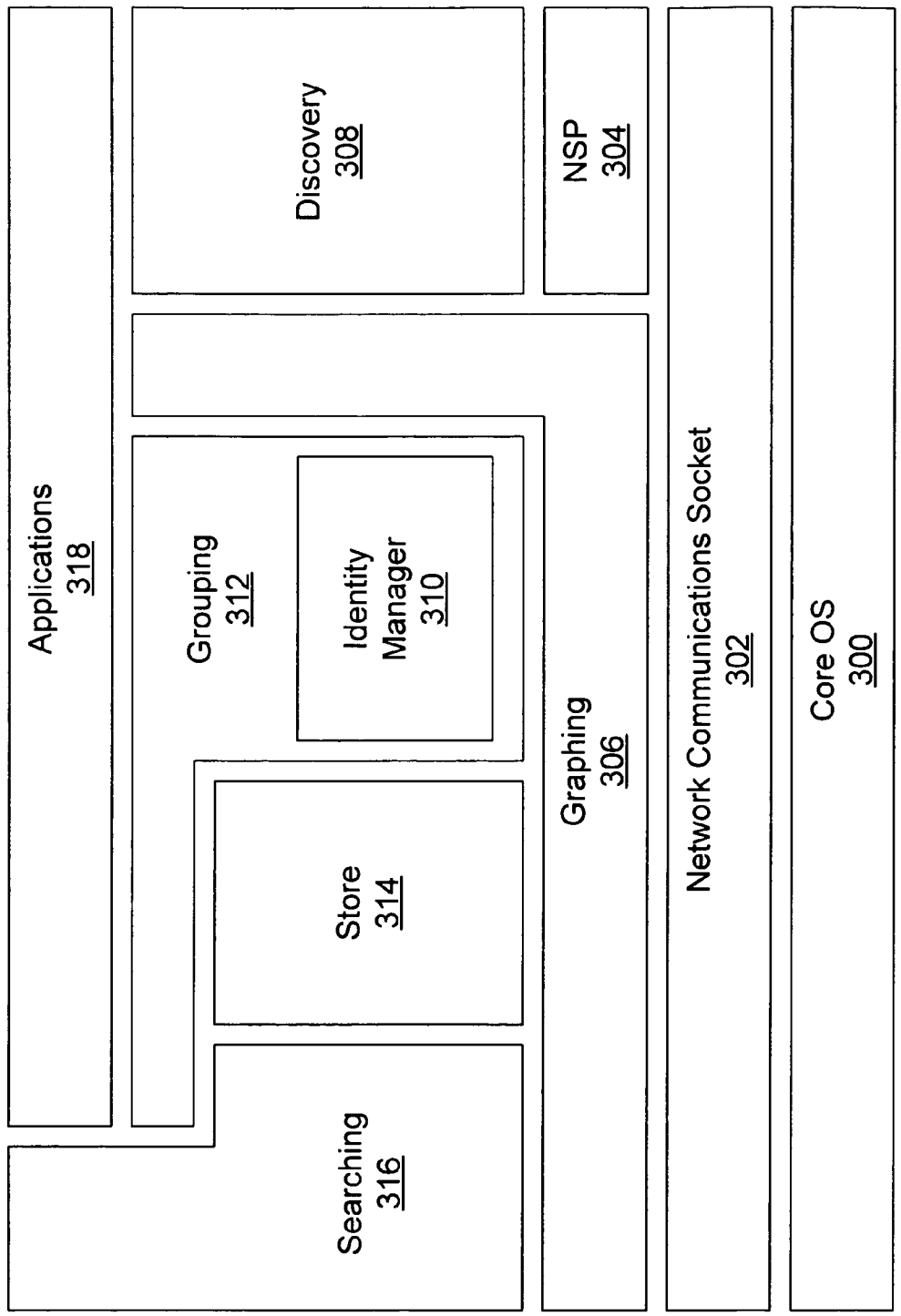
FIG. 3 is a schematic diagram showing an exemplary peer-to-peer networking infrastructure architecture.

Turning to FIG. 3, an exemplary peer-to-peer architecture is illustrated. The peer-to-peer infrastructure resides primarily between the operating system (OS) 300 and socket 302 layers and the application layer 318. Of particular importance are the discovery 308, graphing 306, and grouping 312 components. At the bottom most layer of the architecture is the core OS 300. The OS is, in one embodiment, the Windows operating system by Microsoft of Redmond, Wash. As will be appreciated by one of ordinary skill in the art, the OS should be understood to also include similar operating systems. Residing between the peer-to-peer architecture and the OS is the network communications socket layer 302. The socket layer 302 allows the peer-to-peer architecture to leverage the operating system's interface with lower level network communication protocols. The discovery protocol 308 is a peer name resolution protocol (PNRP) that enables the resolution of a peer name to an IP address in a completely serverless fashion. Thus, with the discovery protocol 308, it is possible for a computing device to locate a peer on a network without the need for a separate server to maintain peer network location information. The graphing component 306 allows for the organization of a given set of network nodes so that data can be efficiently disseminated amongst them. Specifically, graphing 306 addresses data dissemination in a network that is not fully connected and provides for one-to-many dissemination of the data. The grouping component 312 associates a security model with one or more graphs created by the graphing component 306. With the grouping 312 module, a peer is able to create a group, own a group, and define members (users or machines) that are allowed to join the group.

In one embodiment of the graphing component 306 employed by the present invention, interfaces and methods can be implemented through an application programming interface (API). Such an embodiment is particularly well suited for the Microsoft Windows XP operating system in which the APIs may be as follows:

```
// Graph interfaces
HRESULT WINAPI PeerGraphStartup(
        IN      WORD                    wVersionRequested,
        OUT     PPEER_VERSION_DATA pVersionData);
HRESULT WINAPI PeerGraphShutdown( );
VOID WINAPI PeerGraphFreeData(
        IN      PVOID                   pvData);
HRESULT WINAPI PeerGraphGetItemCount(
        IN      HPEERENUM               hPeerEnum,
        OUT     PULONG                  pCount);
HRESULT WINAPI PeerGraphGetNextItem(
        IN      HPEERENUM               hPeerEnum,
        IN OUT PULONG                   pCount,
        OUT     PVOID           *       ppvItems);
HRESULT WINAPI PeerGraphEndEnumeration(
        IN      HPEERENUM               hPeerEnum);
HRESULT WINAPI PeerGraphCreate(
        IN      PPEER_GRAPH_PROPERTIES  pGraphProperties,
        IN      PCWSTR                  pwzDatabaseName,
        IN      PPEER_SECURITY_INTERFACE
pSecurityInterface,
        OUT     PHGRAPH                 phGraph);
HRESULT WINAPI PeerGraphOpen(
        IN      PCWSTR                  pwzGraphId,
        IN      PCWSTR                  pwzPeerId,
        IN      PCWSTR                  pwzDatabaseName,
        IN      PPEER_SECURITY_INTERFACE
pSecurityInterface,
        IN      ULONG                   cRecordTypeSyncPrecedence,
        IN      GUID *                  pRecordTypeSyncPrecedence,
        OUT     PHGRAPH                 phGraph);
HRESULT WINAPI PeerGraphListen(
        IN      HGRAPH                  hGraph,
        IN      DWORD                   dwScope,
        IN      DWORD                   dwScopeId,
        IN      WORD                    wPort);
HRESULT WINAPI PeerGraphConnect(
        IN      HGRAPH                  hGraph,
        IN      PCWSTR                  pwzPeerId,
        IN      PPEER_ADDRESS           pAddress,
        OUT     ULONGLONG *             pullConnectionId);
HRESULT WINAPI PeerGraphClose(
        IN      HGRAPH                  hGraph);
HRESULT WINAPI PeerGraphDelete(
        IN      PCWSTR                  pwzGraphId,
        IN      PCWSTR                  pwzPeerId,
        IN      PCWSTR                  pwzDatabaseName);
HRESULT WINAPI PeerGraphGetStatus(
        IN      HGRAPH                  hGraph,
        OUT     DWORD           *       pdwStatus);
HRESULT WINAPI PeerGraphGetProperties(
        IN      HGRAPH                  hGraph,
        OUT     PPEER_GRAPH_PROPERTIES *
ppGraphProperties);
HRESULT WINAPI PeerGraphSetProperties(
        IN      HGRAPH                  hGraph,
        IN      PPEER_GRAPH_PROPERTIES pGraphProperties);
// Eventing interfaces
HRESULT WINAPI PeerGraphRegisterEvent(
        IN      HGRAPH                  hGraph,
        IN      HANDLE                  hEvent,
        IN      ULONG                   cEventRegistrations,
        IN      PPEER_GRAPH_EVENT_REGISTRATION
pEventRegistrations,
        OUT     HPEEREVENT *            phPeerEvent);
HRESULT WINAPI PeerGraphUnregisterEvent(
        IN      HPEEREVENT              hPeerEvent);
HRESULT WINAPI PeerGraphGetEventData(
        IN      HPEEREVENT              hPeerEvent,
        OUT     PPEER_GRAPH_EVENT_DATA * ppEventData);
// Data Storage
```

-continued

```
HRESULT WINAPI PeerGraphGetRecord(
       IN      HGRAPH           hGraph,
       IN      GUID *           pRecordId,
       OUT     PPEER_RECORD     * ppRecord);
HRESULT WINAPI PeerGraphAddRecord(
       IN      HGRAPH           hGraph,
       IN      PPEER_RECORD     pRecord,
       OUT     GUID         *   pRecordId);
HRESULT WINAPI PeerGraphUpdateRecord(
       IN      HGRAPH           hGraph,
       IN      PPEER_RECORD     pRecord);
HRESULT WINAPI PeerGraphDeleteRecord(
       IN      HGRAPH           hGraph,
       IN      GUID *           pRecordId,
       IN      BOOL             fLocal);
HRESULT WINAPI PeerGraphEnumRecords(
       IN      HGRAPH           hGraph,
       IN      GUID *           pRecordType,
       IN      PCWSTR           pwzPeerId,
       OUT     HPEERENUM *      phPeerEnum);
HRESULT WINAPI PeerGraphSearchRecords(
       IN      HGRAPH           hGraph,
       IN      PCWSTR           pwzCriteria,
       OUT     HPEERENUM   *    phPeerEnum);
HRESULT WINAPI PeerGraphExportDatabase(
       IN      HGRAPH           hGraph,
       IN      PCWSTR           pwzFilePath);
HRESULT WINAPI PeerGraphImportDatabase(
       IN      HGRAPH           hGraph,
       IN      PCWSTR           pwzFilePath);
HRESULT WINAPI PeerGraphValidateDeferredRecords(
       IN      HGRAPH           hGraph,
       IN      ULONG            cRecordIds,
       IN      GUID *           pRecordIds);
// Node/Connection interfaces
HRESULT WINAPI PeerGraphOpenDirectConnection(
       IN      HGRAPH           hGraph,
       IN      PCWSTR           pwzPeerId,
       IN      PPEER_ADDRESS    pAddress,
       OUT     ULONGLONG *      pullConnectionId);
HRESULT WINAPI PeerGraphSendData(
       IN      HGRAPH           hGraph,
       IN      ULONGLONG        ullConnectionId,
       IN      GUID *           pType,
       IN      ULONG            cbData,
       IN      PVOID            pvData);
HRESULT WINAPI PeerGraphCloseDirectConnection(
       IN      HGRAPH           hGraph,
       IN      ULONGLONG        ullConnectionId);
HRESULT WINAPI PeerGraphEnumConnections(
       IN      HGRAPH           hGraph,
       IN      DWORD            dwFlags,         //
PEER_CONNECTION_FLAGS
       OUT     HPEERENUM   *    phPeerEnum);
HRESULT WINAPI PeerGraphEnumNodes(
       IN      HGRAPH           hGraph,
       IN      PCWSTR           pwzPeerId,
       OUT     HPEERENUM   *    phPeerEnum);
HRESULT WINAPI PeerGraphSetPresence(
       IN      HGRAPH           hGraph,
       IN      BOOL             fPresent);
HRESULT WINAPI PeerGraphGetNodeInfo(
       IN      HGRAPH           hGraph,
       IN      ULONGLONG        ullNodeId,
       OUT     PPEER_NODE_INFO * ppNodeInfo);
HRESULT WINAPI PeerGraphSetNodeAttributes(
       IN      HGRAPH           hGraph,
       IN      PCWSTR           pwzAttributes);
HRESULT WINAPI PeerGraphSystemTimeFromGraphTime(
       IN      HGRAPH           hGraph,
       IN      FILETIME *       pftGraphTime,
       OUT     FILETIME *       pftSystemTime);
```

In one embodiment of the grouping component 312 employed by the present invention, interfaces and methods can be implemented through an API. Such an embodiment is particularly well suited for the Microsoft Windows XP operating system in which the APIs may be as follows:

```
HRESULT WINAPI PeerGroupStartup(
       IN      WORD             wVersionRequested,
       OUT     PPEER_VERSION_DATA pVersionData);
HRESULT WINAPI PeerGroupShutdown( );
VOID WINAPI PeerFreeData(
       IN      PVOID            pvData);
HRESULT WINAPI PeerGetItemCount(
       IN      HPEERENUM        hPeerEnum,
       OUT     PULONG           pCount);
HRESULT WINAPI PeerGetNextItem(
       IN      HPEERENUM        hPeerEnum,
       IN OUT  PULONG           pCount,
       OUT     PVOID       *    ppvItems);
HRESULT WINAPI PeerEndEnumeration(
       IN      HPEERENUM        hPeerEnum);
//////////////////////////////////////////////
// Group interfaces
HRESULT WINAPI PeerGroupCreate(
       IN      PPEER_GROUP_PROPERTIES pProperties,
       OUT     HGROUP       *   phGroup);
HRESULT WINAPI PeerGroupOpen(
       IN      PCWSTR           pwzIdentity,
       IN      PCWSTR           pwzGroupPeerName,
       IN      PCWSTR           pwzCloud,
       OUT     HGROUP       *   phGroup);
HRESULT WINAPI PeerGroupJoin(
       IN      PCWSTR           pwzIdentity,
       IN      PCWSTR           pwzInvitation,
       IN      PCWSTR           pwzCloud,
       OUT     HGROUP       *   phGroup);
HRESULT WINAPI PeerGroupConnect(
       IN      HGROUP           hGroup);
HRESULT WINAPI PeerGroupClose(
       IN      HGROUP           hGroup);
HRESULT WINAPI PeerGroupDelete(
       IN      PCWSTR           pwzIdentity,
       IN      PCWSTR           pwzGroupPeerName);
HRESULT WINAPI PeerGroupCreateInvitation(
       IN      HGROUP           hGroup,
       IN      PCWSTR           pwzIdentityInfo,
       IN      FILETIME *       pftExpiration,
       IN      ULONG            cRoles,
       IN      PEER_ROLE_ID*    pRoles,
       OUT     PWSTR        *   ppwzInvitation);
HRESULT WINAPI PeerGroupParseInvitation(
       IN      PCWSTR           pwzInvitation,
       OUT     PPEER_INVITATION_INFO * ppInvitationInfo);
HRESULT WINAPI PeerGroupGetStatus(
       IN      HGROUP           hGroup,
       OUT     DWORD        *   pdwStatus);
HRESULT WINAPI PeerGroupGetProperties(
       IN      HGROUP           hGroup,
       OUT     PPEER_GROUP_PROPERTIES * ppProperties);
HRESULT WINAPI PeerGroupSetProperties(
       IN      HGROUP           hGroup,
       IN      PPEER_GROUP_PROPERTIES pProperties);
HRESULT WINAPI PeerGroupEnumMembers(
       IN      HGROUP           hGroup,
       IN      DWORD            dwFlags,         //
PEER_MEMBER_FLAGS
       IN      PCWSTR           pwzIdentity,
       OUT     HPEERENUM   *    phPeerEnum);
HRESULT WINAPI PeerGroupOpenDirectConnection(
       IN      HGROUP           hGroup,
       IN      PCWSTR           pwzIdentity,
       IN      PPEER_ADDRESS    pAddress,
       OUT     ULONGLONG   *    pullConnectionId);
HRESULT WINAPI PeerGroupCloseDirectConnection(
       IN      HGROUP           hGroup,
       IN      ULONGLONG        ullConnectionId);
HRESULT WINAPI PeerGroupEnumConnections(
       IN      HGROUP           hGroup,
       IN      DWORD            dwFlags,         //
PEER_CONNECTION_FLAGS
       OUT     HPEERENUM   *    phPeerEnum);
HRESULT WINAPI PeerGroupSendData(
       IN      HGROUP           hGroup,
       IN      ULONGLONG        ullConnectionId,
       IN      GUID *           pType,
       IN      ULONG            cbData,
```

```
        IN      PVOID                   pvData);
// Eventing interfaces
HRESULT WINAPI PeerGroupRegisterEvent(
        IN      HGROUP                  hGroup,
        IN      HANDLE                  hEvent,
        IN      DWORD                   cEventRegistration,
        IN      PPEER_GROUP_EVENT_REGISTRATION
pEventRegistrations,
        OUT     HPEEREVENT      *       phPeerEvent);
HRESULT WINAPI PeerGroupUnregisterEvent(
        IN      HPEEREVENT              hPeerEvent);
HRESULT WINAPI PeerGroupGetEventData(
        IN      HPEEREVENT              hPeerEvent,
        OUT     PPEER_GROUP_EVENT_DATA * ppEventData);
// Data Storage
HRESULT WINAPI PeerGroupGetRecord(
        IN      HGROUP                  hGroup,
        IN      GUID *                  pRecordId,
        OUT     PPEER_RECORD    *       ppRecord);
HRESULT WINAPI PeerGroupAddRecord(
        IN      HGROUP                  hGroup,
        IN      PPEER_RECORD            pRecord,
        OUT     GUID            *       pRecordId);
HRESULT WINAPI PeerGroupUpdateRecord(
        IN      HGROUP                  hGroup,
        IN      PPEER_RECORD            pRecord);
HRESULT WINAPI PeerGroupDeleteRecord(
        IN      HGROUP                  hGroup,
        IN      GUID *                  pRecordId);
HRESULT WINAPI PeerGroupEnumRecords(
        IN      HGROUP                  hGroup,
        IN      GUID *                  pRecordType,
        OUT     HPEERENUM       *       phPeerEnum);
HRESULT WINAPI PeerGroupSearchRecords(
        IN      HGROUP                  hGroup,
        IN      PCWSTR                  pwzCriteria,
        OUT     HPEERENUM       *       phPeerEnum);
HRESULT WINAPI PeerGroupExportDatabase(
        IN      HGROUP                  hGroup,
        IN      PCWSTR                  pwzFilePath);
HRESULT WINAPI PeerGroupImportDatabase(
        IN      HGROUP                  hGroup,
        IN      PCWSTR                  pwzFilePath);
HRESULT WINAPI PeerGroupAuthorizeMembership(
        IN      HGROUP                  hGroup,
        IN      PPEER_MEMBERSHIP_INFO pMemberInfo,
        IN      BOOL                    fAuthorize);
HRESULT WINAPI PeerGroupPeerTimeToUniversalTime(
        IN      HGROUP                  hGroup,
        IN      FILETIME *              pftPeerTime,
        OUT     FILETIME *              pftUniversalTime);
HRESULT WINAPI PeerGroupUniversalTimeToPeerTime(
        IN      HGROUP                  hGroup,
        IN      FILETIME *              pftUniversalTime,
        OUT     FILETIME *              pftPeerTime);
```

Figure 4:
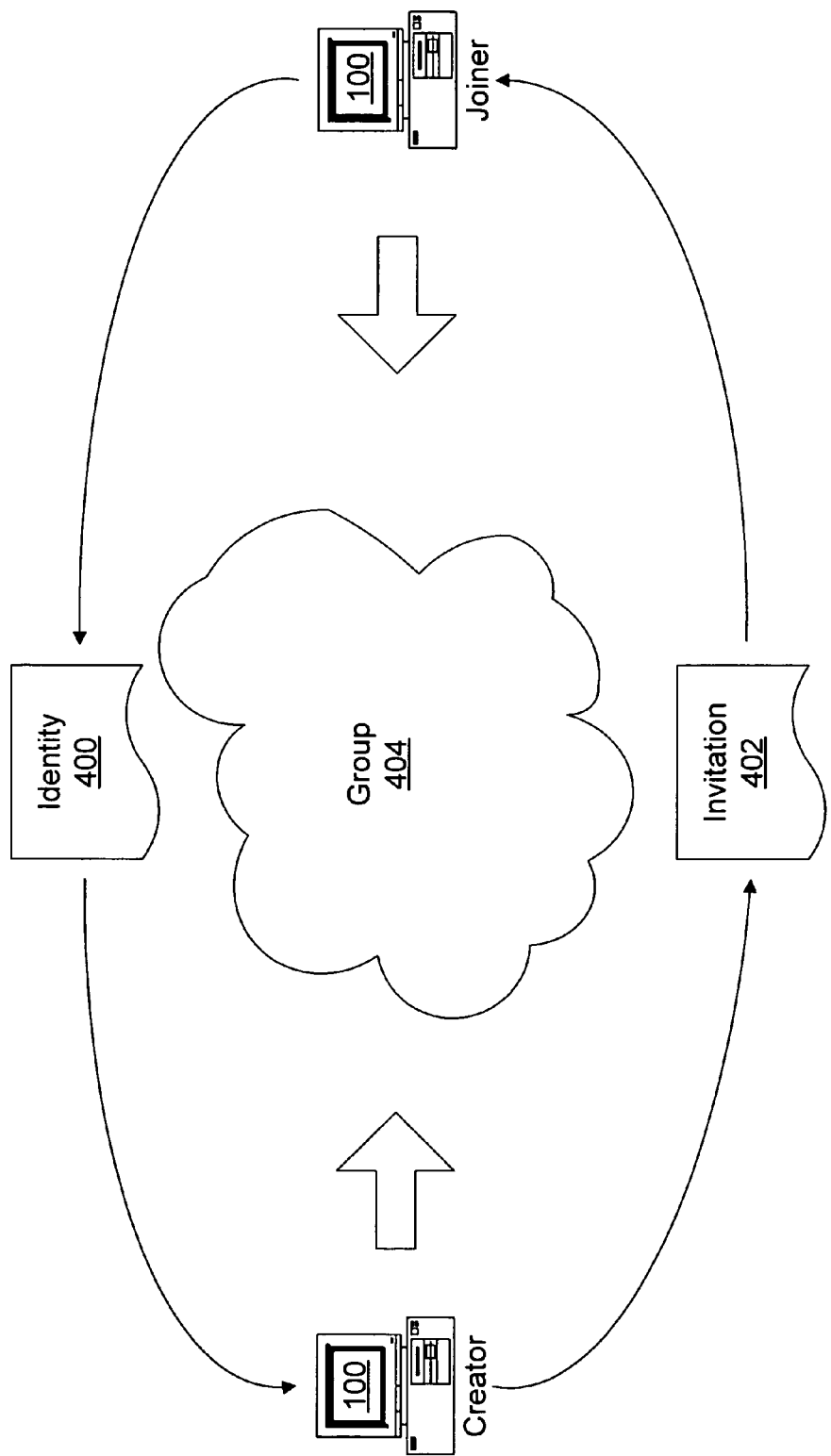
FIG. 4 is a schematic diagram illustrating the process of a peer node joining a peer-to-peer group.
Figure 5:
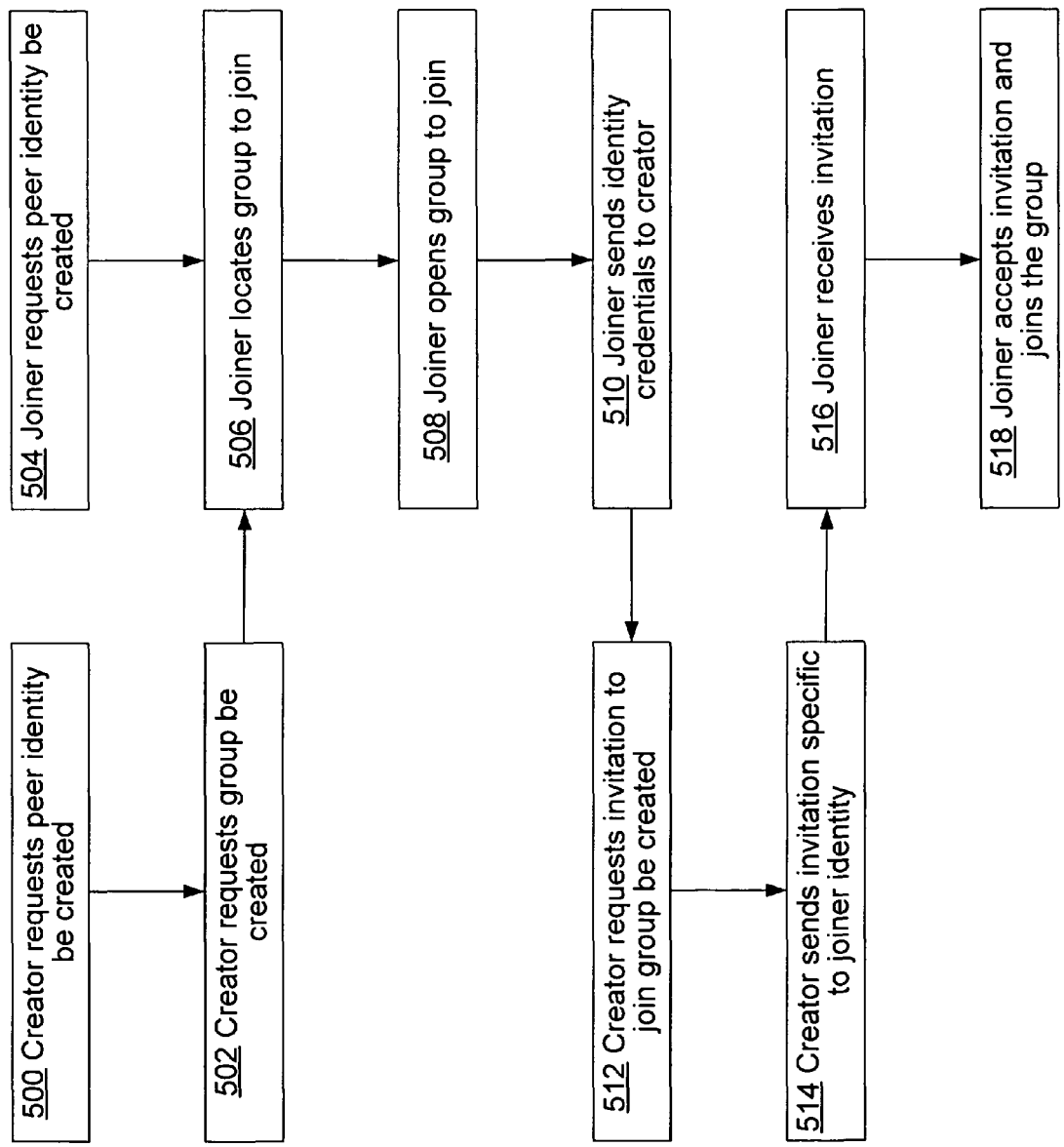
FIG. 5 is a flowchart illustrating the process of a peer node joining a peer-to-peer group.

FIGS. 4 and 5 illustrate the peer-to-peer group creation and joining process. Beginning with step 500, the group creator 100 requests that a peer identity for the application be created by the identity manager 310. Next, in step 502, the group creator 100 requests that a group 404 be created. In step 504 a group joiner 100 requests that a peer identity be created by the identity manager 310. Next, in step 506, using the discovery protocol 308 the group joiner 100 locates a group 404 to join. In step 508 the group joiner 100 opens the group 404 that the joiner wishes to join and in step 510 the group joiner 100 sends its identity 400 credentials to the group creator 100. Upon receipt of the group joiner's identity credentials 400 by the group creator 100, in step 512, the group creator 100 requests that an invitation 402 be created to send to the group joiner 100. Next, in step 514, the group creator 100 sends the invitation 402 to the group joiner 100. Upon receipt of the invitation 402 in step 516, the group joiner 100 accepts the invitation 402 and joins the group 404 in step 518. The preceding steps can be repeated resulting in the formation of a peer-to-peer group such as the one illustrated in FIG. 6.

IV. Content Distribution Leveraging a Peer-To-Peer Network Infrastructure

Figure 6:
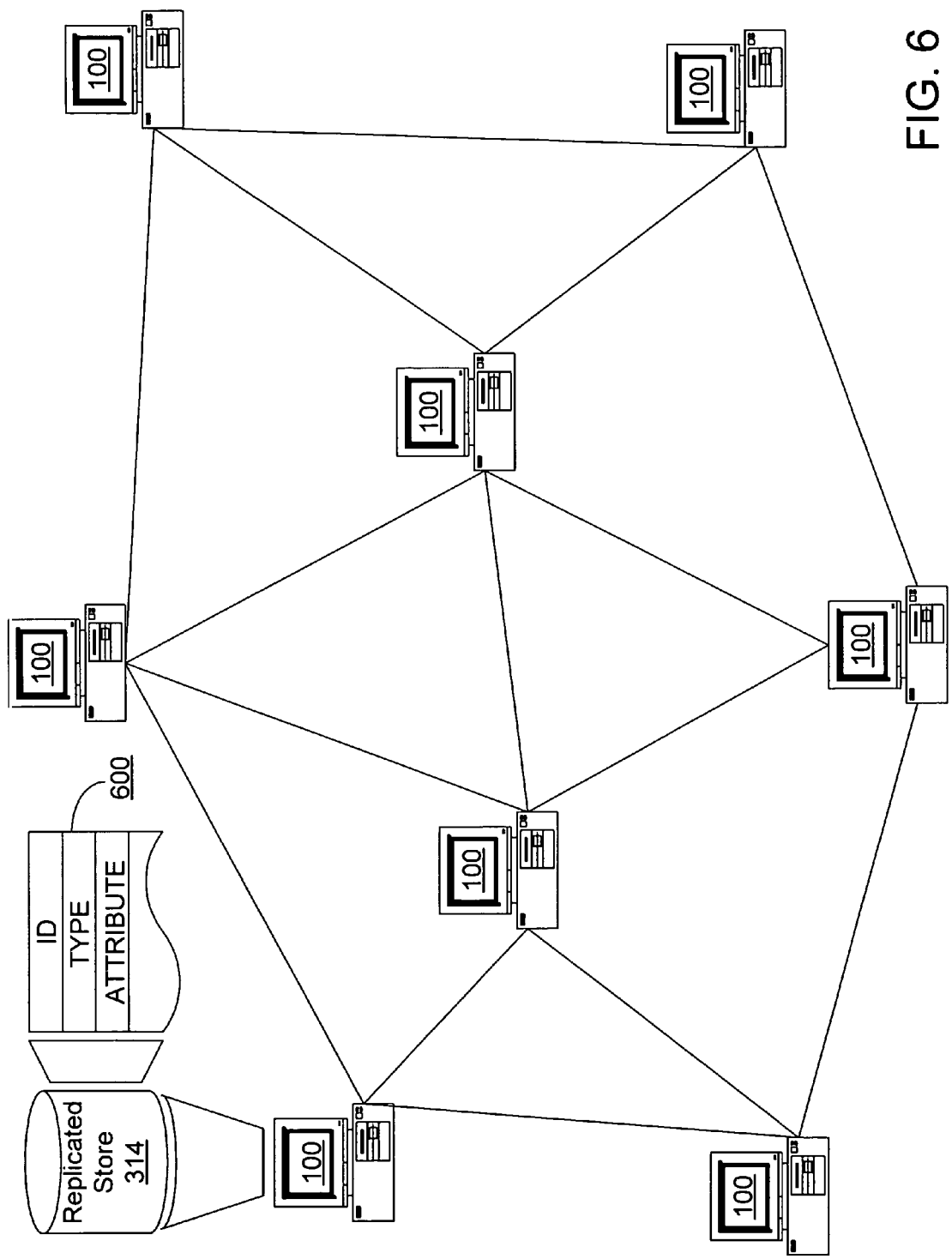
FIG. 6 is a schematic diagram showing an exemplary peer-to-peer group.

With reference to FIG. 6, an exemplary peer-to-peer group is illustrated. In the group, each peer-to-peer node 100 is reachable via a path on the graph of the group. Each peer node 100 in the group has an instance of the replicated store 314. The replicated store 314 is associated with a graph or a group and maintains metadata as to the current state of each node. When a node 100 connects to a group it first synchronizes the replicated store database 314. The nodes 100 maintain this database automatically.

The replicated store 314 houses metadata about the peer-to-peer group in the form of records 600 residing in the store 314. Each record can contain a record ID field, a record type field, and an attribute field. In the case of the present invention, the metadata in the store reflects what content has been distributed to nodes 100 of the group. For each piece of content that has been distributed to a node 100 in the group, a record 600 corresponding to that piece of content exists in the replicated store 314. This record 600 possesses a location attribute that enables a node 100 in the group to ascertain if the desired content is available from within the peer group and, if so, from which nodes 100 in the group.

Figure 7:
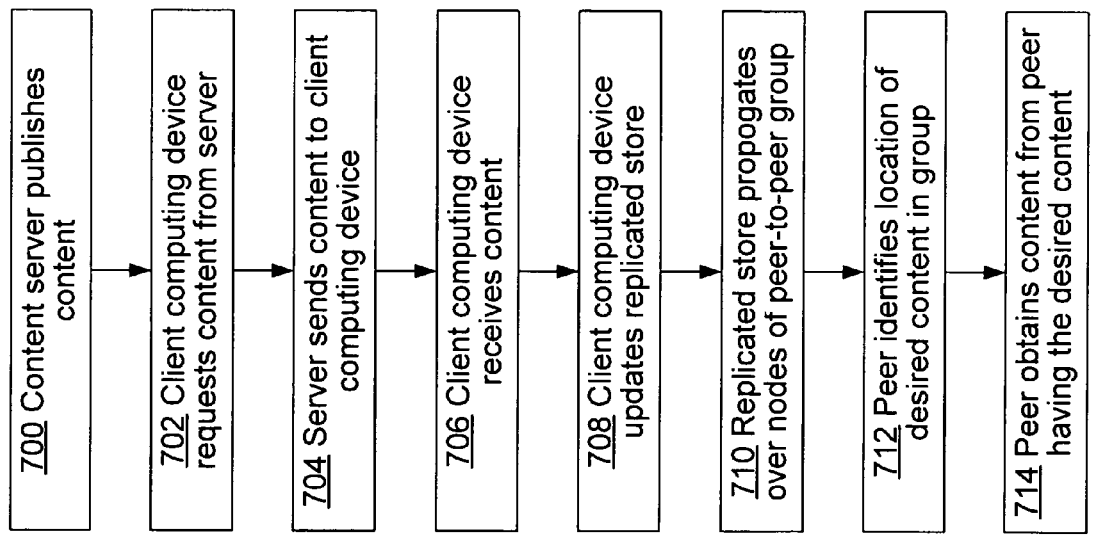
FIG. 7 is a flowchart illustrating the process of content distribution leveraging a peer-to-peer networking infrastructure.

Turning to FIG. 7, the method of peer-to-peer content distribution leveraging a peer-to-peer networking infrastructure is illustrated. Beginning with step 700, a content distribution server publishes content for distribution. Continuing with step 702, a client computing device makes a request to the content distribution server for the published content. In step 704, the content distribution server sends the content to the client computing device and, in step 706, the client computing device receives the desired content. Next, in step 708, the client computing device updates the instance of the replicated store located on the client computing device to reflect the content that was obtained in step 706. In step 710, the update to the replicated store is propagated through the peer-to-peer group to the instances of the replicated store on the nodes of the group. Next, in step 712, a node desiring a piece of content can consult the replicated store to determine if the content is obtainable via the peer-to-peer group. Finally, in step 714, a node which has located the content it desires can receive that content from the peer node in the group having the desired content.

Figure 8:
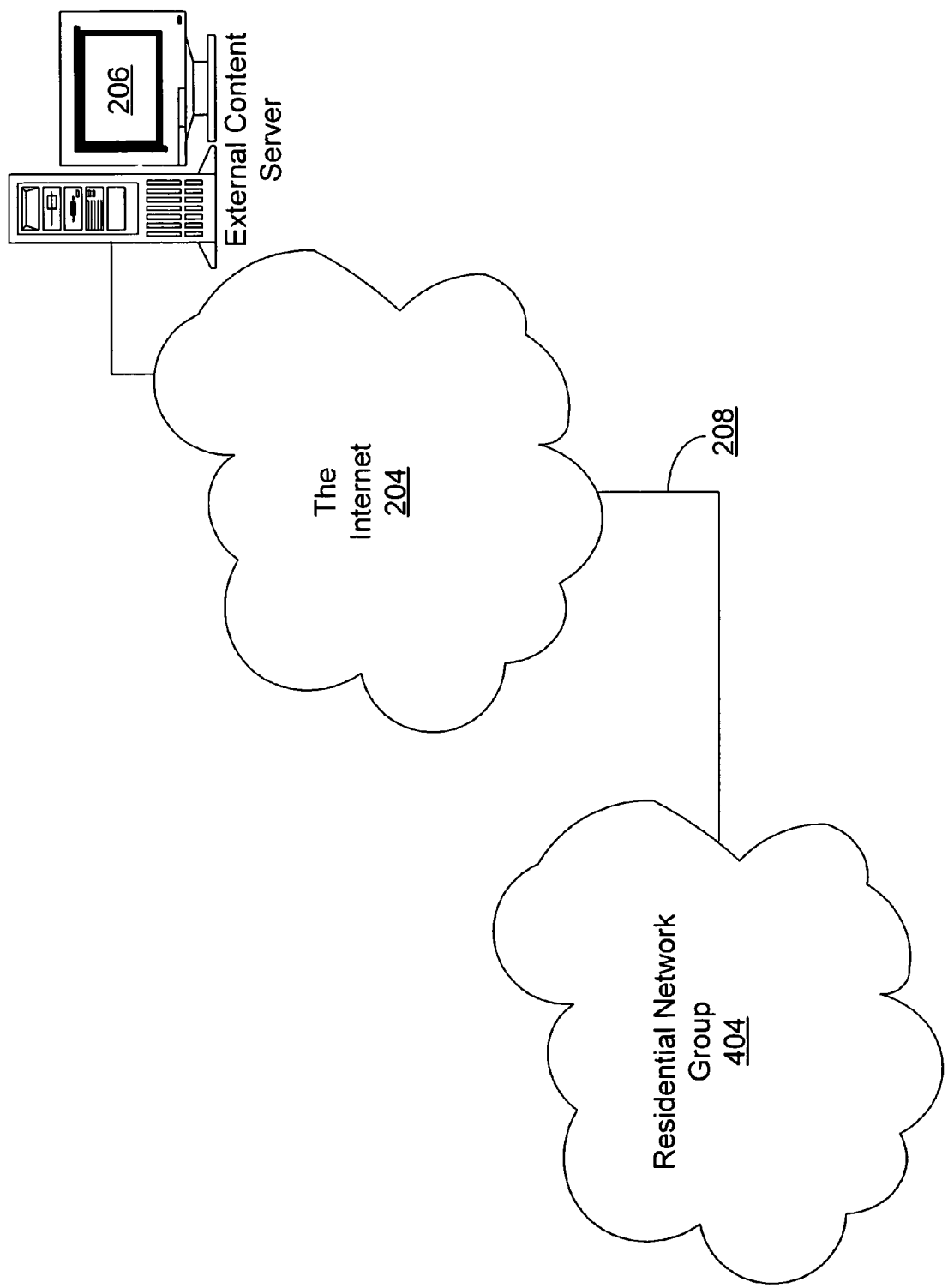
FIG. 8 is a schematic diagram showing an implementation of content distribution leveraging a peer-to-peer networking infrastructure for a residential network.

The above described method can be applied to a variety of content distribution scenarios. One such scenario is illustrated in FIG. 8. FIG. 8 depicts a residential network connected to the Internet 204 via a shared broadband or dial-up connection 208. In a connectivity scheme such as this one, all of the computing devices in the residential network share the bandwidth of the connection 208. In this scenario, leveraging the peer-to-peer networking infrastructure in distributing content would result in a savings of bandwidth of the shared connection 208. Under a server-based content distribution scheme, a home network having five computers desiring content (e.g., applications, patches, product upgrades, virus definitions, etc.) from a central server would require that each computer individually obtain the content. This necessitates five separate requests for content from the central server 206, each request drawing on bandwidth of the connection 208. As illustrated in FIG. 8, the home network can form a peer-to-peer group 404 of computing devices and one client computing device can download the desired content from the external content server 206 via the Internet 204 and connection 208. The other peer computing devices can then simply obtain the content from the node that downloaded it from the external content server 206. The scenario can also be extended for use with applications such as distributed web caches wherein clients can download a web content from another client close to it who may have downloaded that web content recently. Since the speed of the local network connections will typically far rival that of the broadband or dial-up connection, this results in a better overall experience for the user.

Figure 9:
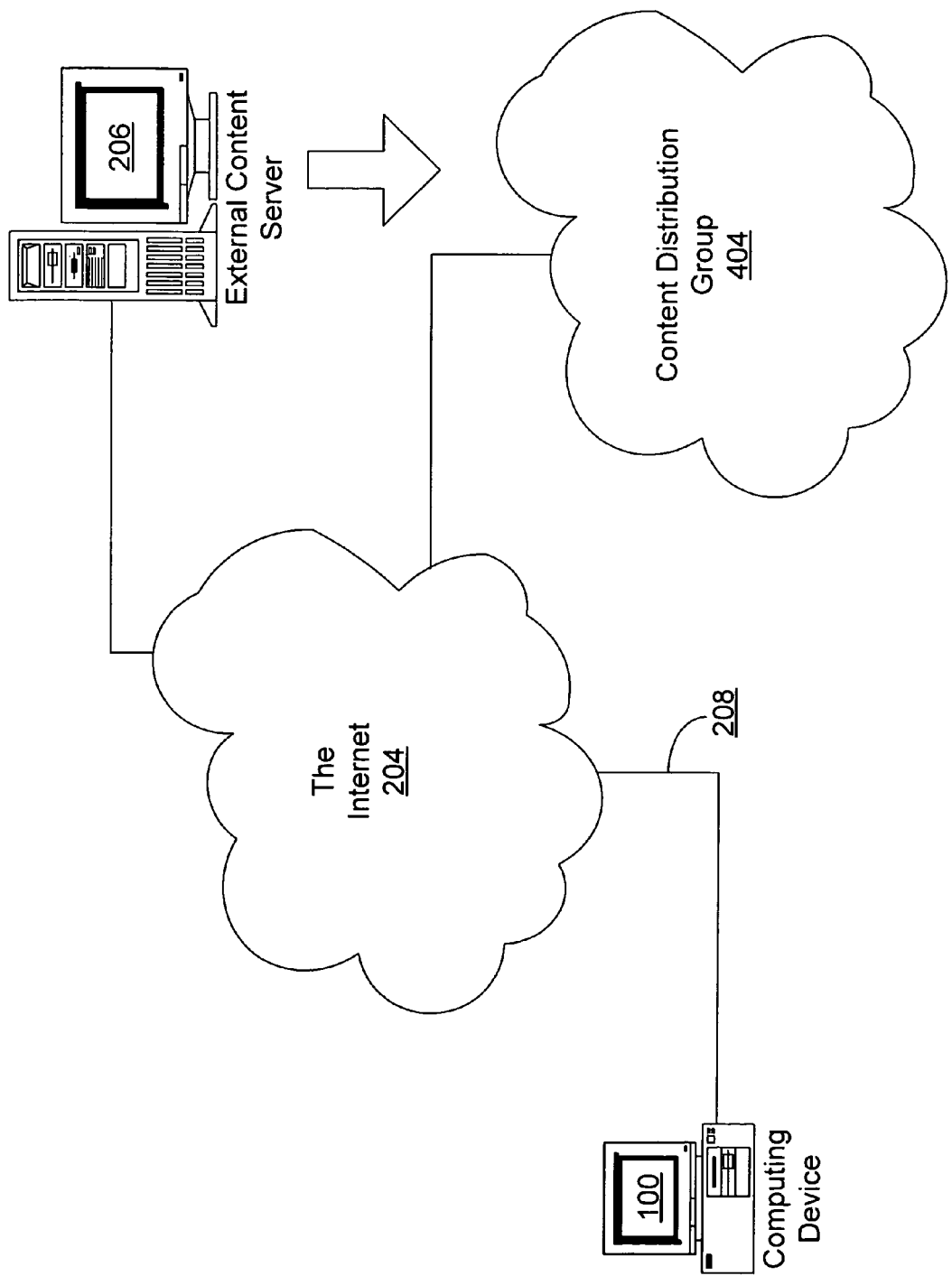
FIG. 9 is a schematic diagram showing an implementation of content distribution leveraging a peer-to-peer networking infrastructure for the Internet.

An additional scenario in which the leveraging of the peer-to-peer network infrastructure results in a more efficient distribution of content is illustrated in FIG. 9. Suppose, for example, the external content server 206 of FIG. 9 is a virus definition server for a large antivirus company. As will be appreciated by one of ordinary skill in the art, the virus definition development life-cycle is typically characterized as a very short "ship cycle." As soon as a new antivirus definition file is available, it is shipped and/or made available for download to the antivirus subscribers. The frequency of such updates to antivirus programs is quite high. Under a server-based content distribution scenario, these updates would be hosted on the external content server 206. The spikes in downloading of these updates, when posted, could potentially cause scaling issues. By leveraging the peer-to-peer networking infrastructure in distributing content, such as virus updates, load on the external content server 206 can be reduced. As illustrated in FIG. 9, a content distribution group 404 can be created and managed by the external content server 206 and requests for content from computing devices 100 can be redirected from the server 206 to the content distribution group 404. Thus, only a handful of customers would need to connect up to the main anti-virus server 206 and the virus patch would automatically be propagated through the content distribution group. In this scenario, the patch itself would likely be signed by the company to ensure that no customer in the distribution group 404 could spoof the patch as coming from the company.

Yet another scenario in which the leveraging of the peer-to-peer network infrastructure can result in a more efficient distribution of content is illustrated in FIG. 10. In a large network such as an enterprise installation, the speed of dissemination of content can be improved when only one or two computing devices 100 download desired content and then, in turn, deliver the content to other computing devices 100. In addition, the computing devices 100 which receive the content from those computing devices 100 that downloaded the content from the content server 206 can advertise the presence of the content such that the load on individual computing devices gets spread out over time. This scenario lends itself well to large enterprise installations where it is not unusual for there to be a need for all computing devices in remote branch offices to download software from a remote server located across a slow wide area network (WAN) link. In much the same respect as the peer-to-peer content distribution solution for a residential network in FIG. 8, the speed of the local network connections will typically be superior to that of the WAN connection and thus result in a more efficient distribution of content. Additionally, in much the same way that the peer-to-peer content distribution solution of FIG. 9 increases the speed at which content can be disseminated over a large area such as the Internet, the peer-to-peer content distribution scenario of FIG. 10 can be particularly useful in situations where the dissemination of the content is time-sensitive, such as a presentation file for an on-line company meeting or a streaming audio file for an on-line concert performance.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

What is claimed is:

1. A method for distributing, from a first computing device to a second computing device over a peer-to-peer network, a software product update from a content server, the method comprising:
    obtaining the software product update, by the first computing device, from the content server via a broadband connection, the first computing device being a client of the content server and a peer in the peer-to-peer network;
    communicating, by the first computing device, to one or more peers in the peer-to-peer network that the software product update is available to be obtained from the first computing device;
    locating, by the second computing device, a closest peer closest to the second computing device, that comprises the software product update, where more than one peer has obtained the software product update;
    determining, by the second computing device, that the first computing device is the closest peer to the second computing device that comprises the software product update; and
    obtaining the software product update, by the second computing device, from the first computing device via the peer-to-peer network, the first computing device connected to the second computing device via a home network, the content server external to the home network.

2. The method of claim 1, the first computing device and the second computing device connected via a local area connection.

3. The method of claim 1, the first computing device and the second computing device connected via a wide area connection.

4. The method of claim 3, the obtaining the software product update by the first computing device comprising:
    requesting the software product update; and
    receiving the software product update at least partially utilizing the wide area connection.

5. The method of claim 1, the peer-to-peer network associated with a spanning tree architecture.

6. The method of claim 1, the home network comprising a home broadband connection.

7. The method of claim 1, the obtaining the software product update by the first computing device comprising:
    requesting the software product update
    utilizing the broadband connection.

8. The method of claim 1, the home network comprising a dial-up connection.

9. The method of claim 8, the obtaining the software product update by the first computing device comprising:
    requesting the software product update; and
    receiving the software product update at least partially utilizing the dial-up connection.

10. The method of claim 1, the communicating to one or more peers in the peer-to-peer network comprising:
    updating a local data store with informational data about the software product update; and
    propagating the informational data to one or more local data stores residing on one or more peers in the peer-to-peer network.

11. The method of claim 1, the determining comprising:
    identifying, by the second computing device, in a local data store of a peer in the peer to peer network, a record corresponding to the software product update; and determining, from the record, at least one computing device in the peer-to-peer network that possesses the software product update, the at least one computing device comprising the first computing device.

12. The method of claim 1, the obtaining the software product update by the second computing device comprising:
sending the software product update, by the first computing device, to the second computing device; and
accepting the software product update, by the second computing device, from the first computing device.

13. The method of claim 1, the obtaining of the software product update, by the first computing device, and the obtaining the software product update, by the second computing device, from the first computing device occurring as a real-time stream of the software product update.

14. The method of claim 1, the software product update comprising a patch for a product.

15. The method of claim 1, the software product update comprising an upgrade for an application.

16. The method of claim 1, the software product update downloaded from the content server at least partially via a Wide Area Network.

17. The method of claim 1, the software product update signed by a source of a product that the software product update is configured to update.

18. A tangible computer-readable storage device comprising instructions that when executed perform a method for distributing, from a first computing device to a second computing device over a peer-to-peer network, a software product update from a content server, the method comprising:
obtaining the software product update, by the first computing device, from the content server via a broadband connection, the first computing device being a client of the content server and a peer in the peer-to-peer network;
communicating, by the first computing device, to one or more peers in the peer-to-peer network that the software product update is available to be obtained from the first computing device;
locating, by the second computing device, a closest peer closest to the second computing device, that comprises the software product update, where more than one peer has obtained the software product update;
determining, by the second computing device, that the first computing device is the closest peer to the second computing device that comprises the software product update; and
obtaining the software product update, by the second computing device, from the first computing device via the peer-to-peer network, the first computing device connected to the second computing device via a home network, the content server external to the home network.

19. The tangible computer-readable storage device of claim 18, the peer-to-peer network associated with a spanning tree architecture.

20. The tangible computer-readable storage device of claim 18, the method comprising identifying, by the second computing device, in a local data store of a peer in the peer to peer network, a record corresponding to the software product update.

21. The tangible computer-readable storage device of claim 20, the method comprising determining, from the record, at least one computing device in the peer-to-peer network that possesses the software product update.

22. The tangible computer-readable storage device of claim 18, the software product update comprising an upgrade for an application.

23. A device for distributing, from a first computing device to a second computing device over a peer-to-peer network, a software product update from a content server, the device comprising:
one or more computer processing devices; and
memory comprising instructions that when executed at least in part via at least some of the one or more computer processing devices perform a method, comprising:
obtaining the software product update, by the first computing device, from the content server via a broadband connection, the first computing device being a client of the content server and a peer in the peer-to-peer network;
communicating, by the first computing device, to one or more peers in the peer-to-peer network that the software product update is available to be obtained from the first computing device;
locating, by the second computing device, a closest peer closest to the second computing device, that comprises the software product update, where more than one peer has obtained the software product update;
determining, by the second computing device, that the first computing device is the closest peer to the second computing device that comprises the software product update; and
obtaining the software product update, by the second computing device, from the first computing device via the peer-to-peer network, the first computing device connected to the second computing device via a home network, the content server external to the home network.

24. The device of claim 23, the peer-to-peer network associated with a spanning tree architecture.

25. The device of claim 23, the method comprising identifying, by the second computing device, in a local data store of a peer in the peer to peer network, a record corresponding to the software product update.

26. The device of claim 25, the method comprising determining, from the record, at least one computing device in the peer-to-peer network that possesses the software product update.

27. The device of claim 23, the software product update comprising a patch for an application.

28. A method for distributing, from a first computing device to a second computing device over a peer-to-peer network, a software product update from a content server, the method comprising:
obtaining the software product update, by the first computing device, from the content server via a broadband connection, the first computing device being a client of the content server and a peer in the peer-to-peer network;
communicating, by the first computing device, to one or more peers in the peer-to-peer network that the software product update is available to be obtained from the first computing device; and
providing the software product update, by the first computing device, to the second computing device via the peer-to-peer network, based at least in part upon a determination of a closest peer closest to the second computing device that comprises the software product update, where more than one peer has obtained the software product update, where the first computing device is determined to be the closest peer to the second computing device that comprises the software product update, where the first computing device is connected to the second computing device via a home network, and where the content server is external to the home network.

29. The method of claim 28, the software product update comprising at least one of a patch for a product and an upgrade for an application.

30. The method of claim 28, the first computing device comprising a first instance of a replicated store.

31. The method of claim 30, the replicated store comprising metadata.

32. The method of claim 31, the metadata associated with the software product update.

33. A tangible computer-readable storage device comprising instructions that when executed perform a method for receiving, by a second computing device from a first computing device over a peer-to-peer network, a software product update from a content server, the method comprising:
  locating, by the second computing device, a closest peer closest to the second computing device, that comprises the software product update, where more than one peer has obtained the software product update;
  determining, by the second computing device, that the first computing device is the closest peer to the second computing device that comprises the software product update; and
  obtaining the software product update, by the second computing device, from the first computing device via the peer-to-peer network, where the software product update is obtained by the first computing device from the content server via a broadband connection, the first computing device being a client of the content server and a peer in the peer-to-peer network, where one or more peers in the peer-to-peer network are communicated to by the first computing device that the software product update is available to be obtained from the first computing device, where the first computing device is connected to the second computing device via a home network, and where the content server is external to the home network.

34. The tangible computer-readable storage device of claim 33, the software product update comprising a patch for a product.

35. The tangible computer-readable storage device of claim 33, the software product update comprising an upgrade for an application.

36. The tangible computer-readable storage device of claim 33, the peer-to-peer network associated with a spanning tree architecture.

37. The tangible computer-readable storage device of claim 33, the software product update signed by a source of a product that the software product update is configured to update.

38. A system for distributing, from a first computing device to a second computing device over a peer-to-peer network, a software product update from a content server, the system comprising:
  the content server;
  a first network component comprising at least some of the peer-to-peer network;
  a second network component comprising at least some of a broadband connection between the content server and the first computing device;
  the first computing device configured to:
    obtain the software product update from the content server via the broadband connection, the first computing device being a client of the content server and a peer in the peer-to-peer network; and
    communicate to one or more peers in the peer-to-peer network that the software product update is available to be obtained from the first computing device; and
  the second computing device configured to:
    locate a closest peer closest to the second computing device, that comprises the software product update, where more than one peer has obtained the software product update;
    determine that the first computing device is the closest peer to the second computing device that comprises the software product update; and
    obtain the software product update from the first computing device via the peer-to-peer network, the first computing device connected to the second computing device via a home network, the content server external to the home network.

39. The system of claim 38, the first computing device comprising a first instance of a replicated store, the second computing device comprising a second instance of the replicated store.

40. The system of claim 39, the first instance comprising at least a first indication that the first computing device comprises a first piece of content.

41. The system of claim 40, the second instance comprising at least a second indication that the second computing device comprises a second piece of content.

42. The system of claim 39, at least one of:
  the first instance updated to comprise an indication comprised in the second instance; and
  the second instance updated to comprise an indication comprised in the first instance.

* * * * *